United States Patent
Okawa et al.

(10) Patent No.: US 7,190,957 B2
(45) Date of Patent: Mar. 13, 2007

(54) BASE STATION CONNECTION METHOD, RADIO NETWORK CONTROLLER, AND MOBILE STATION

(75) Inventors: Koichi Okawa, Yokohama (JP); Shinya Tanaka, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 156 days.

(21) Appl. No.: 10/628,357

(22) Filed: Jul. 29, 2003

(65) Prior Publication Data

US 2004/0023693 A1    Feb. 5, 2004

(30) Foreign Application Priority Data

Aug. 1, 2002 (JP) ............................. 2002-224955

(51) Int. Cl.
*H04Q 7/20* (2006.01)
*H04B 7/185* (2006.01)
*H01Q 1/00* (2006.01)

(52) U.S. Cl. ...................... 455/436; 455/437; 455/444; 342/354; 343/777

(58) Field of Classification Search ................ 455/436, 455/437, 444; 342/354; 343/777
See application file for complete search history.

(56) References Cited

U.S. PATENT DOCUMENTS

| | | | |
|---|---|---|---|
| 4,670,899 A | * | 6/1987 | Brody et al. ................. 455/453 |
| 5,379,447 A | | 1/1995 | Bonta et al. |
| 5,404,576 A | * | 4/1995 | Yahagi ........................ 455/524 |
| 5,499,386 A | * | 3/1996 | Karlsson ..................... 455/444 |
| 5,551,060 A | * | 8/1996 | Fujii et al. .................. 455/447 |
| 6,006,096 A | * | 12/1999 | Trompower .............. 455/456.2 |

(Continued)

FOREIGN PATENT DOCUMENTS

CN    1284819 A    2/2001

(Continued)

OTHER PUBLICATIONS

S. Tanaka, et al., IEICE Transactions on Fundamentals of Electronics, Communications and Computer Sciences, vol. E80-A, No. 12, pp. 2445-2454, "Pilot Symbol-Assisted Decision-Directed Coherent Adaptive Array Diversity for DS-CDMA Mobile Radio Reverse Link", Dec. 1997.

*Primary Examiner*—William Trost
*Assistant Examiner*—Ariel Balaoing
(74) *Attorney, Agent, or Firm*—Oblon, Spivak, McClelland, Maier & Neustadt, P.C.

(57) ABSTRACT

A method for connecting the radio link between a mobile station and a base station is provided to improve quality of received signals at the base station and the mobile station. A radio network controller (RNC) monitors the difference between the reception power of signals from the source base station BS1 and the destination base station BS2. If the base station BS2 is incapable of directional beam signal transmission and reception, and when the reception power difference becomes smaller than a first handover threshold, the radio network controller adds the base station BS2 as a radio link connection destination of the mobile station. If the base station BS2 is capable of directional beam signal transmission and reception, and when the reception power difference becomes smaller than a second handover threshold, which is larger than the first handover threshold, the radio network controller adds the base station BS2 as a radio link connection destination of the mobile station.

13 Claims, 15 Drawing Sheets

U.S. PATENT DOCUMENTS

| | | |
|---|---|---|
| 6,055,428 A | 4/2000 | Soliman |
| 6,141,565 A | 10/2000 | Feuerstein et al. |
| 6,233,455 B1 * | 5/2001 | Ramakrishna et al. ...... 455/437 |
| 6,301,234 B1 * | 10/2001 | Lee ........................... 370/331 |
| 6,580,910 B1 * | 6/2003 | Mazur et al. ............... 455/440 |
| 6,631,266 B1 * | 10/2003 | Lee et al. ................... 455/446 |
| 6,639,551 B2 | 10/2003 | Li et al. |
| 2002/0019231 A1 * | 2/2002 | Palenius et al. ............ 455/437 |
| 2002/0077113 A1 * | 6/2002 | Spaling et al. .............. 455/453 |
| 2002/0082012 A1 | 6/2002 | Wang et al. |

FOREIGN PATENT DOCUMENTS

| | | |
|---|---|---|
| EP | 1 089 588 A1 | 4/2001 |
| WO | WO 99/33304 | 7/1999 |
| WO | WO 00/38456 | 6/2000 |

\* cited by examiner

BASE STATION CONNECTION METHOD, RADIO NETWORK CONTROLLER, AND MOBILE STATION

BACKGROUND OF THE INVENTION

1. Field of the Invention

The present invention relates to a method for connecting a mobile station to a base station in a mobile communication system including both base stations capable of directional beam signal transmission and reception and base stations incapable of directional beam signal transmission and reception, and a radio network controller and a mobile station utilizing the method.

2. Description of the Related Art

In a communication system utilizing DS-CDMA (Direct Sequence-Code Division Multiple Access), multiple mobile stations work in the same frequency band and communicate with a base station. In the DS-CDMA communication system, signals transmitted from or received by the mobile stations are identified by spread codes. For example, Gold codes or other orthogonal codes may be used as the spread codes.

Considering a case in which a specific mobile station transmits signals to or receives signals from a base station, in the course of spectrum despreading, signals transmitted between the base station and other mobile stations act as interference signals with respect to the signals transmitted between the specific mobile station and the base station (below, the latter is referred to as target signal). The electric power of the interference signals is on average equal to one over a processing gain (PG).

In a non-synchronized uplink communication environment in which signals are transmitted from mobile stations to a base station, the signals transmitted from the mobile stations are subject to instantaneous fluctuations, short interval fluctuations, and distance fluctuations caused by fading. Therefore, in order that the communications between the specific mobile station and the base station possess required quality, transmission power of the specific mobile station should be adjusted so that the ratio of strength of signals from the specific mobile station to strength of signals from the other mobile stations is constant. This ratio is so-called SIR (Signal to Interference power Ratio).

However, even if the transmission power of the specific mobile station is controlled perfectly and the SIR of signals received by the base station is maintained to be constant, in a multi-path communication environment, the spread codes are not completely orthogonal codes. As a result, the target signals from the specific mobile station are subject to interference caused by electric power cross-correlation of other mobile stations, and the strength of the interference due to each of the other mobile stations is equal to one over the processing gain (PG) on average. Accordingly, if the number of mobile stations working in the same frequency band increases, the level of the power of the interference signals increases. Consequently, in the related art, the number of mobile stations operable in each cell is limited by the reception characteristics determined by the required communication quality.

In order to increase the number of mobile stations operable in each cell, interference cancellation techniques are employed, which involve reduction of the cross-correlation. One example of these techniques is the so-called "adaptive antenna array diversity" technique. In this technique, multiple antennas are used to transmit and receive signals. To the signals received by each of the antennas, an appropriate weighting factor is applied, and the resultant signals are synthesized. This enables reduction of the interference of signals from other mobile stations with the target signals from the specific mobile station. For example, a reception method based on adaptive antenna array diversity is discussed in "Pilot symbol-assisted decision-directed coherent adaptive array diversity for DS-CDMA mobile radio reverse link", by S. Tanaka, M. Sawahashi, and F. Adachi, IEICE Trans. Fundamentals, Vol. E80-A, pp. 2445–2454, December 1997.

FIG. 1 is a view showing an example of a configuration of a base station-employing the adaptive array diversity reception method.

The base station shown in FIG. 1 includes a number of m antennas 200-1 through 200-M, a RF radio set 202, a number of m matched filters 204-1 through 204-M, a weighting factor controller 205, a number of m multipliers 206-1 through 206-M, an accumulator 208, a phase fluctuation estimation unit 210, a multiplier 212 for compensating the phase fluctuation, an identification determination unit 214, an accumulator 216, a multiplier 218 for estimating the phase fluctuation, and a measurement unit 220 for measuring the ratio of the interference signal power to the target signal power.

In the base station shown in FIG. 1, signals received by the antennas 200-1 through 200-M are detected in the RF radio set 202 by quadrature detection. The matched filters 204-1 through 204-M are in conjunction with the antennas 200-1 through 200-M, and de-spread the output signals from the RF radio set 202, therefore estimating the reception code sequence.

The weighting factor controller 205 calculates the weighting factors to be applied to the output signals from the matched filters 204-1 through 204-M, respectively, based on the output signals from the matched filters 204-1 through 204-M and the output signals from the multiplier 218 for estimating the phase fluctuation.

The multipliers 206-1 through 206-M apply the calculated weighting factors to the output signals from the matched filters 204-1 through 204-M, respectively. The accumulator 208 synthesizes the output signals from the multipliers 206-1 through 206-M and outputs the synthesized signal.

The multiplier 212, which is for compensating the phase fluctuation, multiplies the output signal from the phase fluctuation estimation unit 210 with the output signal from the accumulator 208 so as to perform phase compensation. The identification determination unit 214 receives the output signals from the multiplier 212, and outputs the final received data (reproduced data). The accumulator 216 outputs the difference between the input and output signals. The multiplier 218, which is for estimating the phase fluctuation, multiplies the output signals from the phase fluctuation estimation unit 210 and the output signals from the accumulator 216, and outputs the resultant signals to the weighting factor controller 205.

The measurement unit 220 measures the ratio of the power of the target signals to the power of the interference signals (SIR) based on the output signals from the accumulator 208. Further, the measurement unit 220 compares the measured SIR with a predetermined reference SIR, and generates a control signal for adjusting the transmission power of the mobile station concerned to make the actual SIR equal to the reference SIR.

The base station transmits common pilot channel signals using an omnidirectinal beam to all the mobile stations in a cell. The common pilot channel signals are used for channel estimation and measurement of the reception power for all mobile stations in the cell. Meanwhile, the base station uses dedicated pilot channels to send specific information to each mobile station in the cell. The base station transmits the dedicate pilot channel signals using a directional beam or an omnidirectinal beam.

FIG. 2 illustrates an example in which an omnidirectional beam 250 is used for transmitting both the common pilot channel signals and the dedicated pilot channel signals. FIG. 3 illustrates an example in which a directional beam 251 is used for transmitting the dedicated pilot channel signals, and an omnidirectional beam 250 is used for transmitting the common pilot channel signals.

In the base station shown in FIG. 1, which employs the adaptive array diversity reception method, signals received by multiple antennas are de-spread, then the de-spread signals from each antenna are multiplied by an antenna weighting factor, and then are synthesized. Further, the base station makes adjustments so that the SIR of the synthesized signals becomes the maximum. The dedicated pilot channel signals are transmitted by an omnidirectional beam, and this improves the SIR of the received signals at the base station and all mobile stations, and results in better quality of the received signals.

In a cellular mobile communication system including a number of base stations, each base station forms a cell to cover a service area of the cellular mobile communication system. Further, in a cellular mobile communication system employing DS-CDMA, communications are performed using different spread codes, enabling communication with the same carrier wave frequencies in all cells.

In a cellular mobile communication system, usually a mobile station is positioned in a cell, and via a radio link communicates with the base station that forms the cell. When the mobile station moves in a region overlapped by a number of cells, the mobile station communicates with the base stations that form these cells via the radio link. When the mobile station further moves out of the overlapping region and into a region of a cell formed by a single base station, the mobile station communicates with the single base station via the radio link. This procedure is called "handover".

FIG. 4 is a view showing the relation between the position of a mobile station (MS) and the reception power of the common pilot channel (CPICH) signals in the course of handover. The reception power of the common pilot channel (CPICH) signals means the power of the common pilot channel (CPICH) signals received at the mobile station.

The graph in FIG. 4 is explained below.

At certain time intervals, the mobile station measures the reception power of the common pilot channel signals from a number of base stations in the surrounding area transmitted at certain transmission power levels, and reports the results to a RNC (radio network controller) for controlling the radio link connection between the mobile station and the base stations. According to the measured reception power of the common pilot channel signals from the base stations in the surrounding area, the mobile station selects a base station yielding the largest reception power of the common pilot channel signals, connects to the base station via the radio link, specifies the setting of the dedicated pilot channel and transmits information to or receives information from the base station.

As shown in FIG. 4, when the mobile station is within the service area of a base station BS1 but out of the service area of a base station BS2, the reception power of the common pilot channel signals transmitted from the base station BS1 is larger than the reception power of the common pilot channel signals transmitted from the base station BS2. Therefore, the mobile station connects to the base station BS1 through the radio link, specifies the setting of the dedicated pilot channel and transmits information to or receives information from the base station BS1.

Then, when the mobile station moves away from the base station BS1 and close to the base station BS2, the reception power of the common pilot channel signals transmitted from the base station BS1 decreases, and the reception power of the common pilot channel signals transmitted from the base station BS2 increases, and the difference between the reception power of the common pilot channel signals transmitted from the base station BS1 and the reception power of the common pilot channel signals transmitted from the base station BS2 decreases gradually. When the difference becomes smaller than a predetermined threshold value (handover threshold, or specifically handover addition threshold), the RNC specifies the base station BS2 as an additional radio link connection destination of the mobile station. Therefore, the mobile station connects to the base station BS2 through the radio link, specifies the setting of the dedicated pilot channel and transmits information to or receives information from the base station BS2. Hence, the mobile station now communicates with both the base station BS1 and the base station BS2.

FIG. 5 is a schematic view showing the control procedure when a mobile station is communicating with multiple base stations. In uplink communications, base stations 302-1 and 302-2 each receive signals from a mobile station 300, and demodulate the signals. Further, the base stations 302-1 and 302-2 transmit the demodulated signals together with reliability information to the higher-ranking RNC 306 through the uplink cable transmission channel 308-2 and 308-1, respectively. The RNC 306 selects the demodulated signals from the base stations 302-1 and 302-2 and synthesizes them based on reliability information. Consequently, the quality of the received signals in the uplink communications is improved.

On the other hand, in downlink communications, the RNC 306 transmit the same signals to the base stations 302-1 and 302-2 through the downlink cable transmission channel 308-4 and 308-3, respectively, and the base stations 302-1 and 302-2 receive the signals at the same time. The mobile station 300 receives signals from the base stations 302-1 and 302-2, and synthesizes the signals. Consequently, the quality of the received signals in the downlink communications is improved.

Returning to FIG. 4 to continue the explanation, when the mobile station, which is communicating with both the base station BS1 and the base station BS2, moves further away from the base station BS1 and close to the base station BS2, the reception power of the common pilot channel signals transmitted from the base station BS2 becomes larger than the reception power of the common pilot channel signals transmitted from the base station BS1, and the difference between the reception power of the common pilot channel signals transmitted from the base station BS2 and the reception power of the common pilot channel signals transmitted from the base station BS1 increases gradually. When the difference reaches a predetermined threshold (handover threshold, or specifically handover deletion threshold), the RNC deletes the base station BS1 from the list of the radio link connection destinations of the mobile station. According to the instruction of the RNC, the base station BS1 disconnects the radio link with the mobile station. Then the mobile station communicates with the base station BS2 only.

Turning to another issue of the conventional cellular mobile communication system, when a mobile station is on standby, the mobile station selects one base station and connects to the base station via the radio link. When the mobile station moves, along with the movement, the mobile station disconnects the present radio link connection with the selected base station, and connects to a next base station via the radio link, and repeats the base station switching operation sequentially in the same way.

FIG. 6 is a view showing the relation between the position of a mobile station (MS) and the reception power of the common pilot channel (CPICH) signals when the mobile station (MS) is on standby. Here, it is assumed that the transmission power levels of the base stations BS1 and BS2 are the same.

At certain time intervals, the mobile station measures the reception power of the common pilot channel signals from a number of base stations in the surrounding area transmitted at certain transmission power levels, selects a base station yielding the largest reception power of the common pilot channel signals and connects to the base station via the radio link. Then the mobile station is on standby, that is, continues to receive the common pilot channel signals and waits to receive communication signals from the base station.

As shown in FIG. 6, when the mobile station is within the service area of the base station BS1 but out of the service area of a base station BS2, the reception power of the common pilot channel signals transmitted from the base station BS1 is larger than the reception power of the common pilot channel signals transmitted from the base station BS2. Therefore, the mobile station connects to the base station BS1 through the radio link and is on standby.

Then, when the mobile station moves away from the base station BS1 and close to the base station BS2, the reception power of the common pilot channel signals transmitted from the base station BS1 decreases, and the reception power of the common pilot channel signals transmitted from the base station BS2 increases, and the difference between the reception power of the common pilot channel signals transmitted from the base station BS2 and the reception power of the common pilot channel signals transmitted from the base station BS1 increases gradually. When the difference becomes smaller than a predetermined value (cell selection threshold), the mobile station disconnects the radio link with the base station BS1 and connects to the base station BS2, being on standby.

Meanwhile, when the difference between the reception power of the common pilot channel signals transmitted from the base station BS1 and the reception power of the common pilot channel signals transmitted from the base station BS2 becomes larger than the cell selection threshold, the mobile station disconnects the radio link with the base station BS2, connects to the base station BS1, and continues the standby state.

Turning to the problem to be solved by the present invention, as described above, in order to improve the quality of the received signals at a base station and a mobile station, it is preferable that the mobile station preferentially connect the radio link with a base station capable of directional signal transmission and reception. However, in the related art, as described above, when switching base stations in a handover process or when the mobile station is on standby, it is not taken into consideration whether the base station is capable of directional signal transmission and reception, hence an appropriate control is not performed to further improve the quality of the received signals at the base station and the mobile station.

SUMMARY OF THE INVENTION

Accordingly, it is a general object of the present invention to solve the above problem of the related art.

A more specific object of the present invention is to provide a method for connecting a mobile station to a base station able to improve quality of received signals at the base station and the mobile station.

To attain the above object, according to a first aspect of the present invention, there is provided a method of connecting a mobile station with a base station via a radio link in a mobile communication system including a first base station capable of directional beam signal transmission and reception and a second base station incapable of directional beam signal transmission and reception, the method comprising the step of: preferentially connecting the mobile station to the first base station rather than to the second base station.

Preferably, the step of preferentially connecting the mobile station to the first base station includes a step of setting different handover threshold values for connecting and disconnecting the mobile station with the first base station and the second station, respectively, when the mobile station undergoes handover. Alternatively, the step of preferentially connecting the mobile station to the first base station includes a step of setting different threshold values for connecting and disconnecting the mobile station with the first base station and the second station, respectively, when the mobile station is on standby and switches a connection destination thereof.

According to the above aspect of the present invention, different threshold values are set for connecting and disconnecting the mobile station with the first base station, which is capable of directional beam signal transmission and reception, and the second station, which is incapable of directional beam signal transmission and reception, respectively, thereby the mobile station is preferentially connected to the first base station, and as a result, quality of the received signals is improvable at the base station and the mobile station.

To attain the above object, according to a second aspect of the present invention, there is provided a radio network controller for controlling a radio link connection between a mobile station and a base station in a mobile communication system including a first base station capable of directional beam signal transmission and reception and a second base station incapable of directional beam signal transmission and reception, the radio network controller comprising a base station connection control unit configured to preferentially connect the mobile station to the first base station rather than to the second base station.

Preferably, the base station connection control unit sets different handover threshold values for connecting and disconnecting the mobile station with the first base station and the second station, respectively.

According to the above aspect of the present invention, by setting different handover threshold values for connecting and disconnecting the mobile station with the first base station and the second base station, the mobile station is preferentially connected to the first base station, and quality of the received signals is improvable at the base station and the mobile station.

Further preferably, the handover threshold value for connecting the mobile station with the first base station is larger than the handover threshold value for connecting the mobile station with the second base station, and the handover threshold value for disconnecting the mobile station and the first base station is larger than the handover threshold value for disconnecting the mobile station and the second base station, where the handover threshold value is defined as an absolute value of a difference between power of signals from a handover source base station and power of signals from a handover destination base station.

According to the above invention, when handing over from any other base station to the first base station, even if the difference between the reception power of signals from a source base station and the destination base station (the first base station) is large, the destination base station is specified as a radio link connection destination and the handover process starts. Meanwhile, when handing over from the first base station to any other base station, even if the difference between the reception power of signals from the source base station (the first base station) and the reception power of signals from the destination base station is large, the radio link connection between mobile station and the source base station is maintained.

Accordingly, the mobile station is preferentially connected to the first base station, and hence improving quality of the received signals at the base station and the mobile station.

To attain the above object, according to a third aspect of the present invention, there is provided a mobile station in a mobile communication system including a first base station capable of directional beam signal transmission and reception and a second base station incapable of directional beam signal transmission and reception, the mobile station comprising a base station connection unit configured to preferentially connect the mobile station to the first base station via a radio link rather than to the second base station.

Preferably, the base station connection unit sets different threshold values for connecting and disconnecting the mobile station with the first base station and the second station, respectively, when the mobile station is on standby and switches a connection destination thereof.

More preferably, the threshold value for switching to the first base station is smaller than the threshold value for switching to the second base station, and the threshold value for switching from the first base station is larger than the threshold value for switching from the second base station, where the threshold value is defined as an absolute value of a difference between power of signals from a switching source base station and power of signals from a switching destination base station.

According to the above aspect of the present invention, by setting different threshold values for connecting and disconnecting the mobile station with the first base station and the second station when switching a connection destination of the mobile station, the mobile station is preferentially connected to the first base station, therefore, quality of the received signals is improvable at the base station and the mobile station.

When the mobile station is on standby and moves close to the first base station, even if the difference between the reception power of signals from a source base station and the reception power of signals from the destination base station (the first base station) is small, the mobile station switches its connection destination to the first station. Meanwhile, when the mobile station is on standby and moves away from the first base station, even if the difference between the reception power of signals from the source base station (the first base station) and the reception power of signals from the destination base station is large, the radio link connection destination between the mobile station and the first base station is maintained.

Accordingly, the mobile station is preferentially connected to a base station capable of directional beam signal transmission and reception, and hence quality of the received signals is improvable at the base station and the mobile station.

Preferably, the mobile station further comprises a base station determination unit configured to identify and distinguish the first base station from the second base station.

Preferably, the mobile station further comprises a threshold value receiver configured to receive the threshold values for switching a connection destination of the mobile station.

According to the above aspect of the present invention, the mobile station is able to distinguish the first base station from the second base station, and the mobile station is able to receive the threshold values from communication terminals on the outside.

These and other objects, features, and advantages of the present invention will be more apparent from the following detailed description of the preferred embodiments given with reference to the accompanying drawings.

DESCRIPTION OF THE PREFERRED EMBODIMENTS

Below, preferred embodiments of the present invention are explained with reference to the accompanying drawings.

Figure 1:
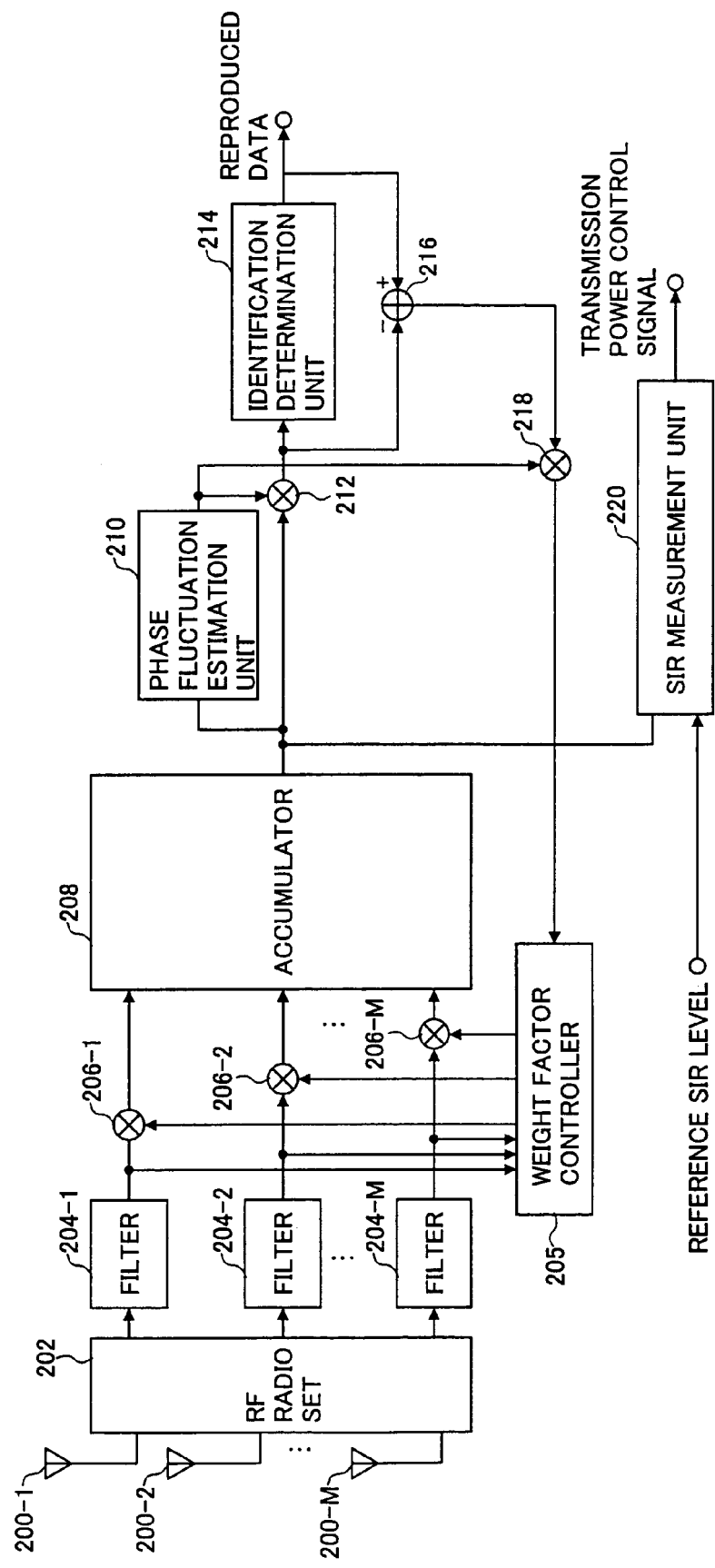
FIG. 1 is a block diagram showing an example of a configuration of a base station employing the adaptive array diversity reception method.
Figure 2:
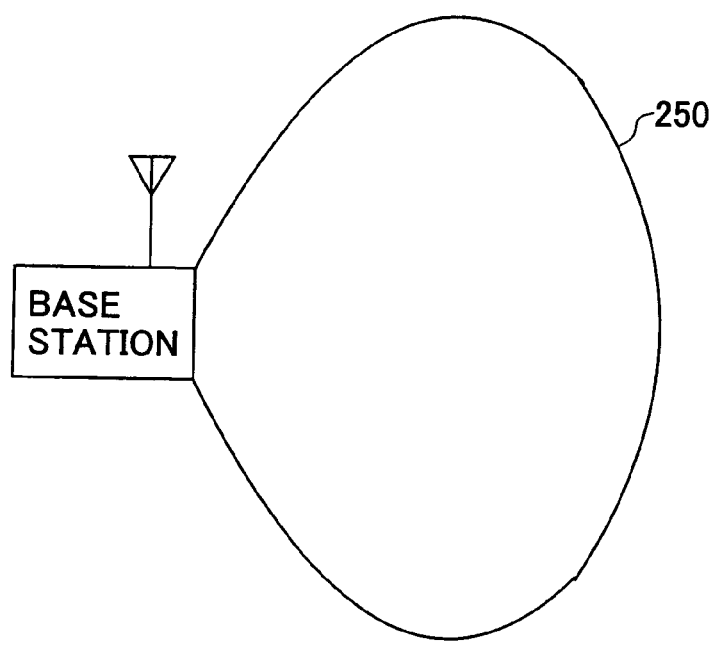
FIG. 2 illustrates an example of an omnidirectional beam 250 transmitting both the common pilot channel signals and the dedicate pilot channel signals.
Figure 3:
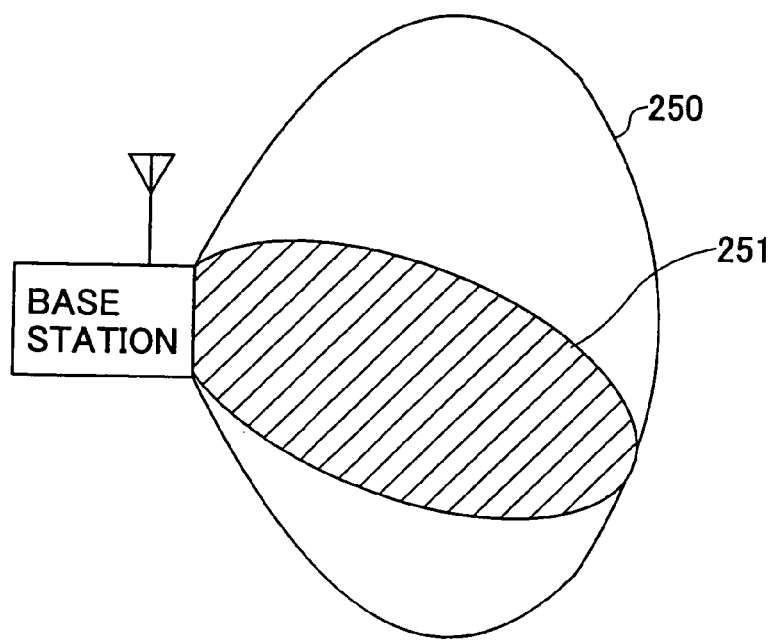
FIG. 3 illustrates an example of a directional beam 251 transmitting the dedicate pilot channel signals and an omnidirectional beam 250 transmitting the common pilot channel signals.
Figure 4:
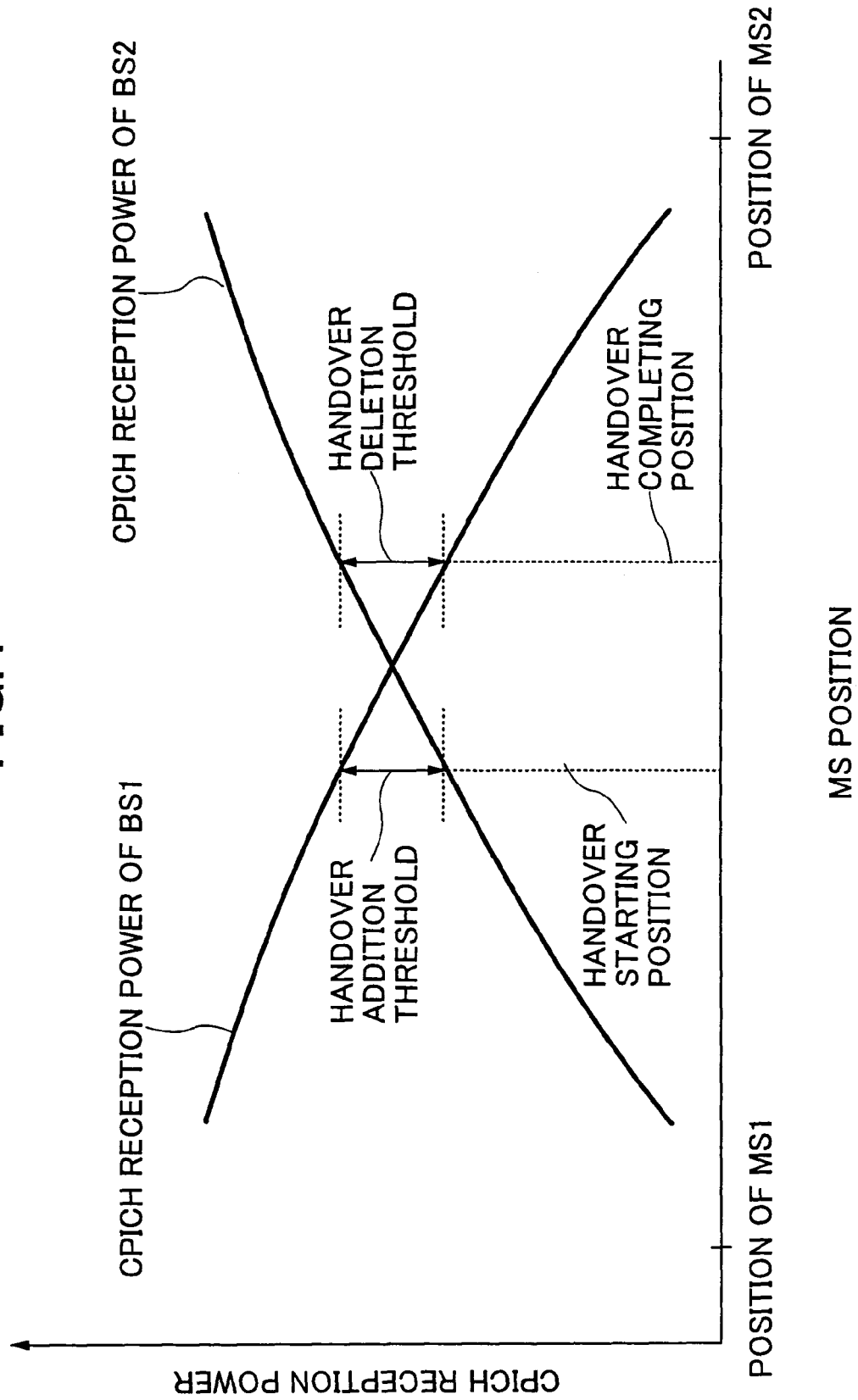
FIG. 4 is a graph showing the relation between the position of a mobile station (MS) in the course of handover and the reception power of the common pilot channel (CPICH) signals.
Figure 5:
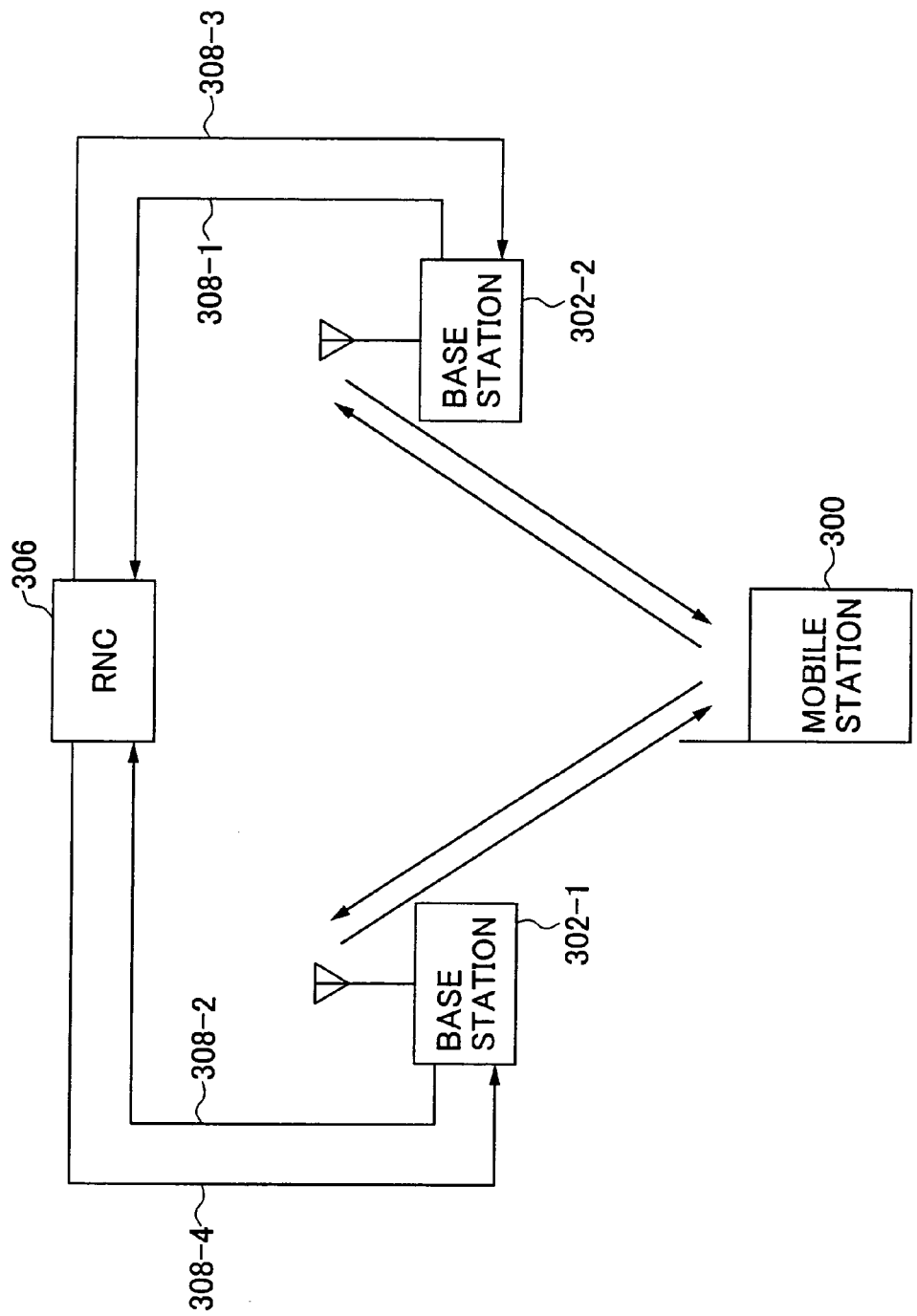
FIG. 5 is a schematic view showing the control procedure when a mobile station is communicating with multiple base stations.
Figure 6:
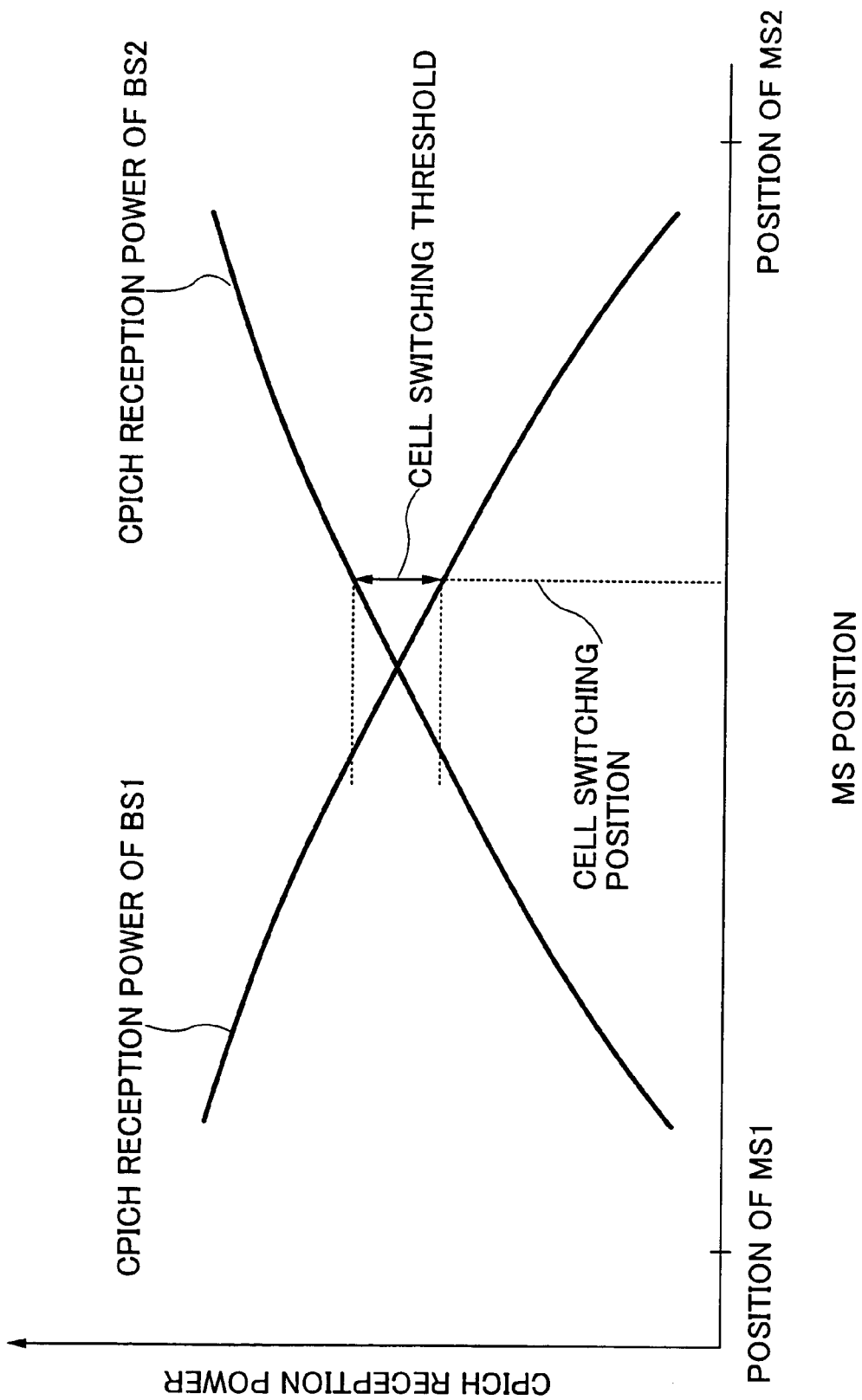
FIG. 6 is a graph showing the relation between the position of a mobile station on standby and the reception power of the common pilot channel signals.
Figure 7:
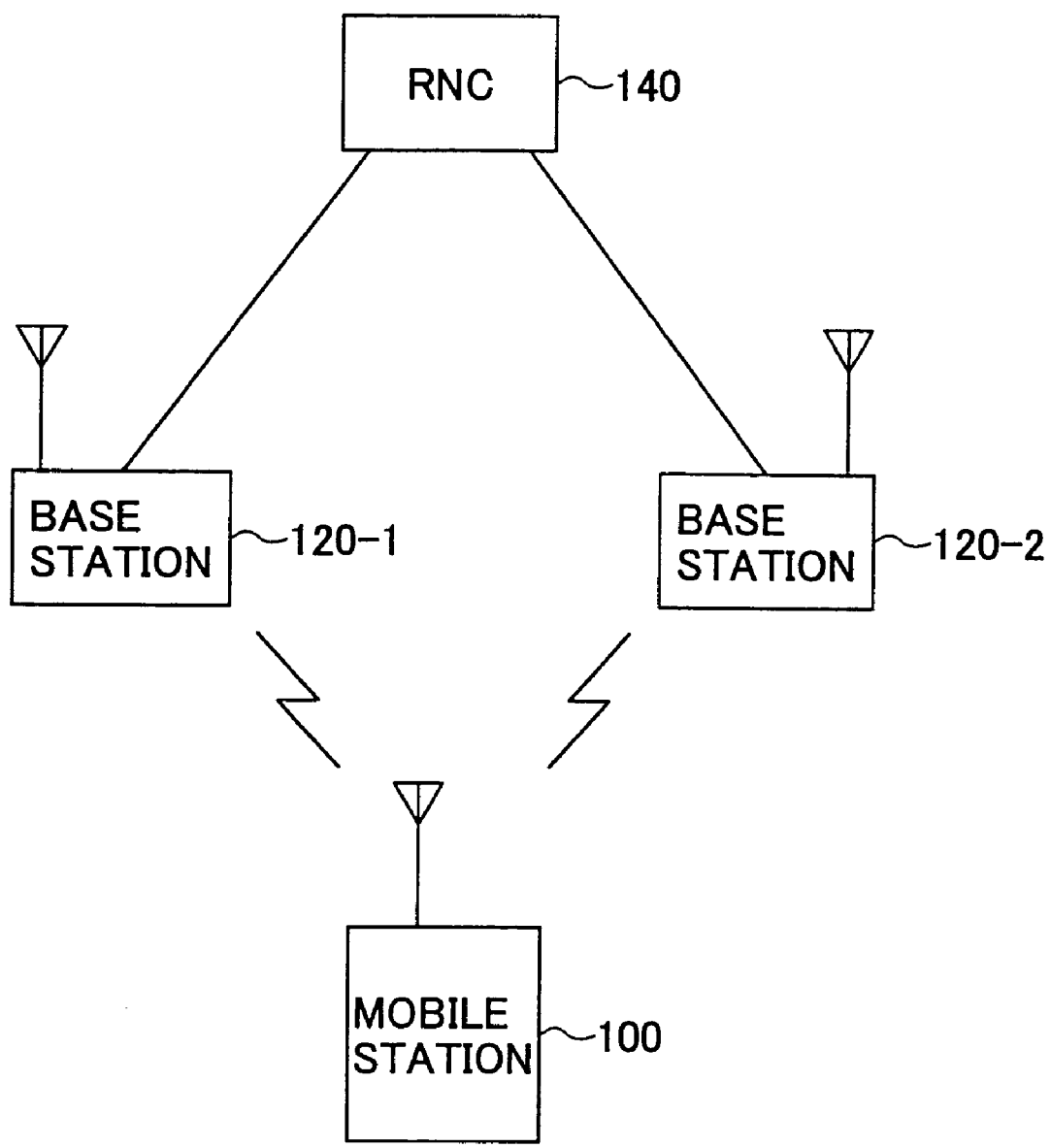
FIG. 7 is a view showing an example of a configuration of a mobile communication system.

FIG. 7 is a view showing an example of a configuration of a mobile communication system.

The mobile communication system in FIG. 7, for example, is a mobile communication system employing DS-CDMA, including a mobile station 100, base stations 120-1 and 120-2, and a radio network controller (RNC) 140 for controlling the radio link between the mobile station 100 and the base stations 120-1 and 120-2, and the whole mobile communication system. Below, the base stations 120-1 and 120-2 are simply denoted as base stations 120 when convenient.

Figure 8:
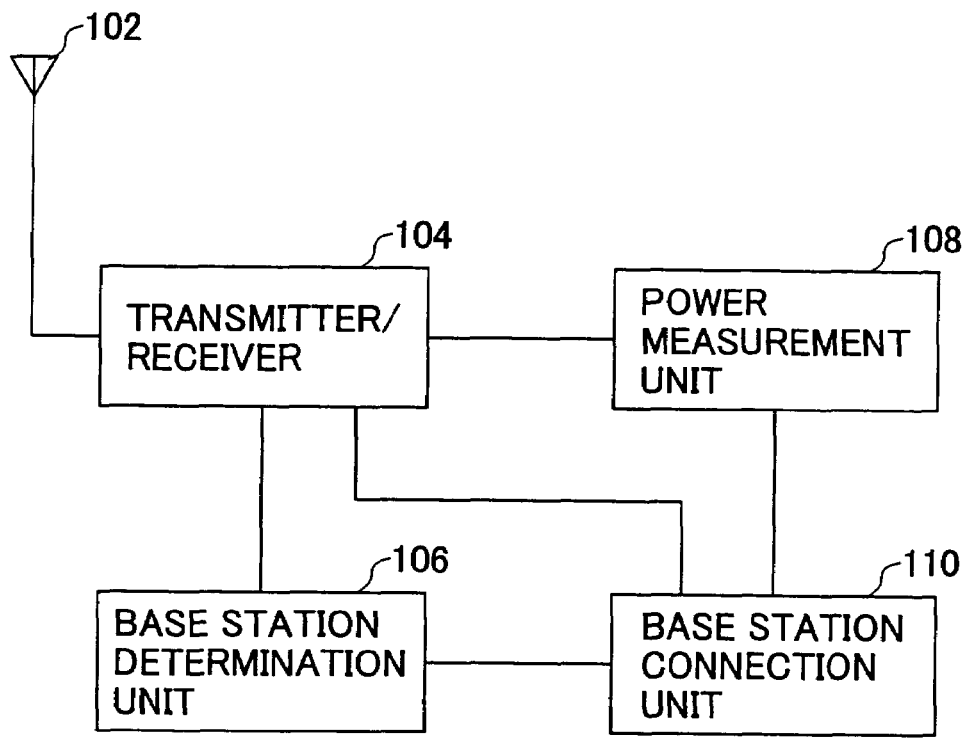
FIG. 8 is a block diagram showing an example of a configuration of the mobile station 100.

FIG. 8 is a block diagram showing an example of a configuration of the mobile station 100. As shown in FIG. 8, the mobile station 100 includes an antenna 102, a transmitter and receiver 104, a base station determination unit 106, a power measurement unit 108, and a base station connection unit 110. It should be noted that only elements related to the present invention are presented in FIG. 8.

The transmitter and receiver 104 receives signals from and transmits signals to the base station 120 via the antenna 102. Specifically, the transmitter and receiver 104 receives the common pilot channel signals transmitted from a number of base stations 120 in the surrounding area at certain transmission power levels. The common pilot channel signals are spread using scramble codes, which are used to identify the base station 120 serving as the transmission source. Further, the transmitter and receiver 104 receives signals from the RNC 140 using the downlink control channel through the base stations 120 in the surrounding area, and these signals include information indicating whether the base station 120 is capable of directional beam signal transmission and reception. Further, between the mobile station 100 and the base station 140 connected by the radio link, the transmitter and receiver 104 transmits and receives signals using the dedicated pilot channel.

The base station determination unit 106 determines whether each of the base stations 120 in the surrounding area is capable of directional beam signal transmission and reception. The determination results are sent to the base station connection unit 110 together with the corresponding scramble codes of the base station 120.

The power measurement unit 108 measures the reception power of the common pilot channel (CPICH) signals received by the transmitter and receiver 104. The power measurement unit 108 transmits the measurement results to the RNC 140 via the transmitter and receiver 104, the antenna 102, and the base station 120, and further outputs the results to the base station connection unit 110.

The base station connection unit 110 selects one of the base stations in the surrounding area to act as the base station 120, that is, the connection destination of mobile station 100 via the radio link when the mobile station 100 is on standby. In addition, the base station connection unit 110 connects the mobile station 100 with the base station 120 via the radio link. Specifically, the base station connection unit 110 determines whether each of the base stations 120 in the surrounding area is capable of directional beam signal transmission and reception on the basis of the determination results indicating whether each of the base stations 120 in the surrounding area is capable of directional beam signal transmission and reception, together with the corresponding scramble codes of the base station 120 transmitted from the base station determination unit 106. In addition, the base station connection unit 110 determines the reception power of the common pilot signals transmitted from the base station 120 on the basis of the reception power of the common pilot channel signals transmitted from the power measurement unit 108.

Further, the base station connection unit 110 switches the base station 120, which is the connection destination of the mobile station 100 via the radio link when the mobile station 100 is on standby. The details of the switching process are described below.

Figure 9:
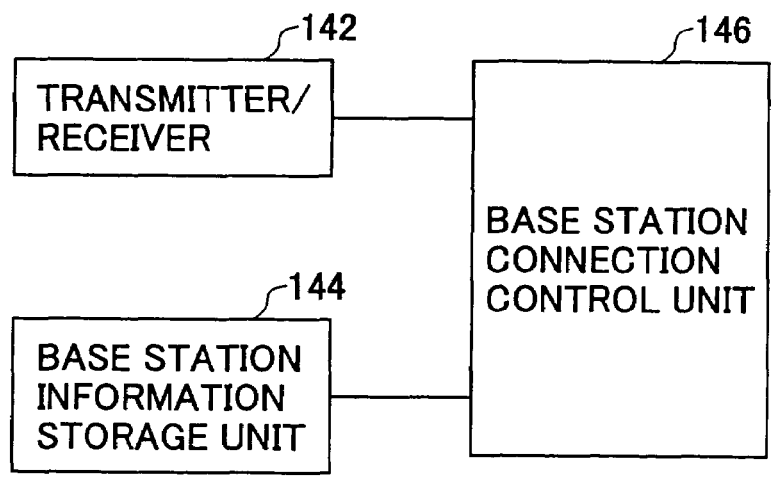
FIG. 9 is a block diagram showing an example of a configuration of the radio network controller 140.

FIG. 9 is a block diagram showing an example of a configuration of the radio network controller 140. The RNC 140 shown in FIG. 9 includes a transmitter/receiver 142, a base station information storage unit 144, and a base station connection control unit 146. Similar to FIG. 8, only elements related to the present invention are presented in FIG. 9.

The transmitter and receiver 142 receives signals from and transmits signals to the base station 120. For example, the transmitter and receiver 142 receives signals indicating the reception power of the common pilot channel signals of the mobile station 100 transmitted from the mobile station 100 via the base station 120. The reception power level of the common pilot channel signals of the mobile station 100 is sent to the base station connection control unit 146.

The base station information storage unit 144 stores a combination of the scramble codes of the base stations 120 and the information of directional beam signal transmission and reception capability of the base stations 120, which is sent to the mobile station 100 by the transmitter and receiver 142.

The base station connection control unit 146 determines whether each of the base stations 120 is capable of directional beam signal transmission and reception on the basis of the combination of the scramble codes of capability of the base stations 120 and the information of directional beam signal transmission and reception of the base stations 120 stored in the base station information storage unit 144. Further, the base station connection control unit 146 adds the base stations 120 to or deletes the base stations 120 from the list of the connection destinations of the mobile station 100 via the radio link in the course of handover. The details of the operation are described below.

Below, the first through fourth embodiments of the present invention are explained, where the first embodiment is related to addition of a base station 120 to the list of the connection destinations of the mobile station 100 via the radio link in the course of handover, the second embodiment is related to deletion of a base station 120 from the list of the connection destinations of the mobile station 100 via the radio link in the course of handover, and the third and fourth embodiments are related to switching of the base stations 120 serving as the connection destination of the mobile station 100 via the radio link when the mobile station is on standby. In the following description, the base station BS1 corresponds to the base station 120-1 in FIG. 7, and the base station BS2 corresponds to the base station 120-2 in FIG. 7.

First Embodiment

Below, an explanation is made of the first embodiment of the present invention related to addition of the base station 120 to the list of the connection destinations of the mobile station 100 via the radio link in the course of handover.

Figure 10:
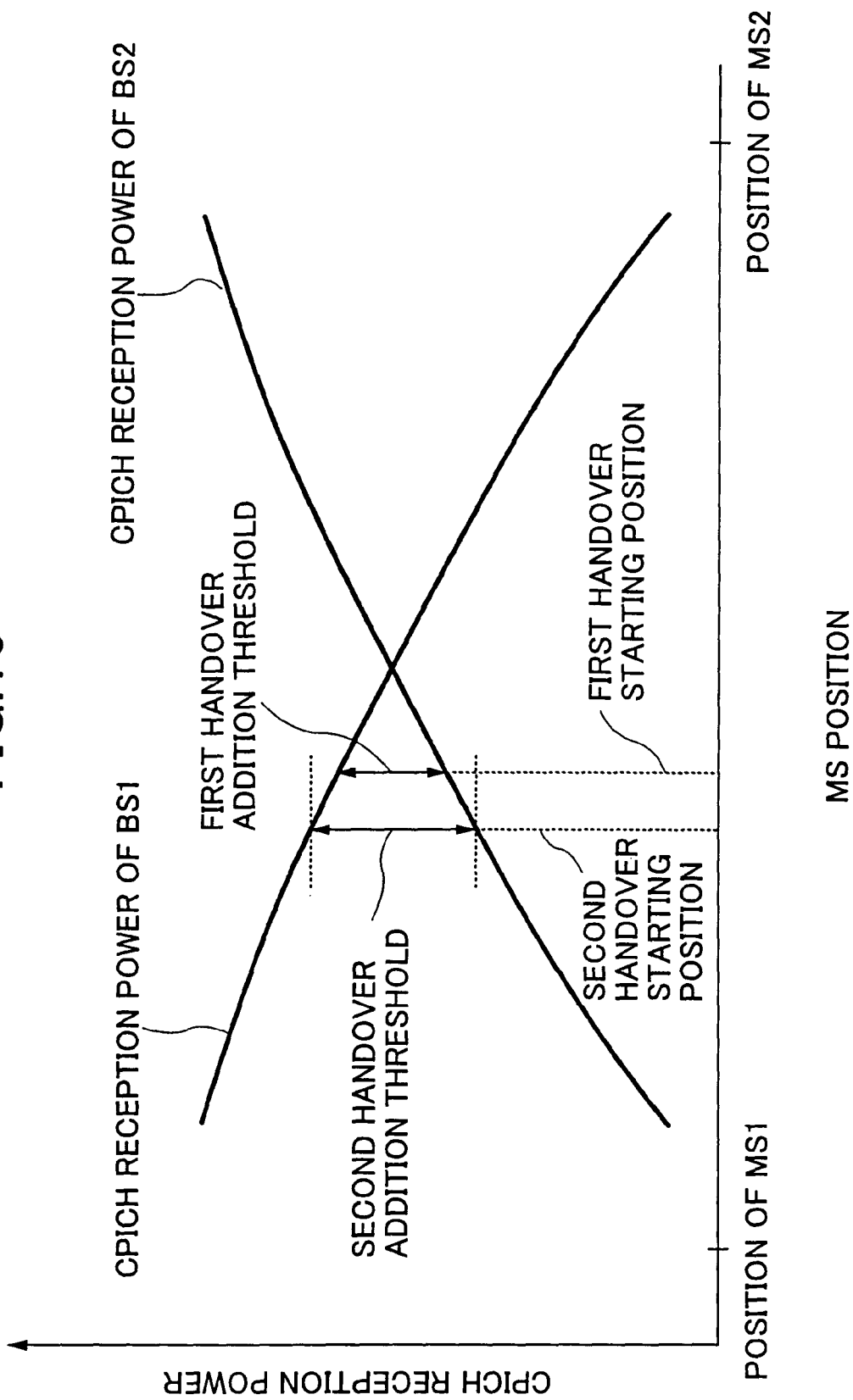
FIG. 10 is a graph showing the relation between the position of the mobile station 100 and the reception power of the common pilot channel signals according to a first embodiment of the present invention.

FIG. 10 is a graph showing the relation between the position of the mobile station 100 and the reception power of the common pilot channel signals in the course of handover according to the first embodiment of the present invention. Here, it is assumed that the base station BS1 is incapable of directional beam signal transmission and reception.

At certain time intervals, the power measurement unit 108 of the mobile station 100 measures the reception power of the common pilot channel signals from base stations in the surrounding area transmitted at certain transmission power levels, for example, signals from base stations BS1 and BS2, and sends the measurement results to the RNC 140.

Further, the base station connection unit 110 of the mobile station 100 selects a base station yielding the largest reception power of the common pilot channel signals, connects to the base station via the radio link, and specifies the settings of the dedicated pilot channel and transmits information to or receives information from the base station.

As shown in FIG. 10, when the mobile station 100 is within the service area of the base station BS1 but out of the service area of the base station BS2, the reception power of the common pilot channel signals transmitted from the base station BS1 is larger than the reception power of the common pilot channel signals transmitted from the base station BS2. Therefore, the base station connection unit 110 of the mobile station 100 connects to the base station BS1 through the radio link, and specifies the settings of the dedicated pilot channel and transmits information to or receives information from the base station BS1.

The base station connection control unit 146 of the RNC 140 monitors the difference between the reception power of the common pilot channel signals transmitted from the base station BS1, which is the handover source, and the reception power of the common pilot channel signals transmitted from the base station BS2, which is the handover destination. Below, this difference is referred to as "the first reception power difference".

When the mobile station 100 moves away from the base station BS1 and close to the base station BS2, the reception power of the common pilot channel signals transmitted from the base station BS1 decreases, and the reception power of the common pilot channel signals transmitted from the base station BS2 increases, and the first reception power difference decreases gradually.

If the destination base station BS2 is incapable of directional beam signal transmission and reception, and when the first reception power difference becomes smaller than a predetermined value (a first threshold, or a first handover addition threshold), the base station connection control unit 146 of the RNC 140 adds the base station BS2 to the list of the connection destinations of the mobile station 100 via the radio link.

Further, the base station connection control unit 146 of the RNC 140 transmits signals including identification information of the mobile station 100 to the base station BS2 to request connection of the radio link. The base station BS2 identifies the mobile station 100 based on the identification information of the mobile station 100 included in the connection request signals, connects with the mobile station 100 via the radio link, and sets the dedicated channel.

If the destination base station BS2 is capable of directional beam signal transmission and reception, and when the first reception power difference becomes smaller than a second threshold, or a second handover addition threshold obtained by adding an offset to the first handover addition threshold, the base station connection control unit 146 of the RNC 140 adds the base station BS2 to the list of the connection destinations of the mobile station 100 via the radio link.

Further, the base station connection control unit 146 of the RNC 140 transmits signals including identification information of the mobile station 100 to the base station BS2 to request connection of the radio link. The base station BS2 identifies the mobile station 100 based on the identification information of the mobile station 100 included in the connection request signals, connects with the mobile station 100 via the radio link, and sets the dedicated channel.

After the mobile station 100 is connected to the destination base station BS2 via the radio link, the handover process is started. After the mobile station 100 is connected with the base station BS2 via the radio link and the dedicated pilot channel is set, the mobile station 100 transmits signals to and receives signals from both the source base station BS1 and the destination base station BS2.

Because the second handover addition threshold is larger than the first handover addition threshold, the position of the mobile station 100 when the base station BS2 is added to the list of the connection destinations of the mobile station 100 via the radio link is different depending on whether the base station BS2 is capable of directional beam signal transmission and reception. Specifically, the position of the mobile station 100 when the base station BS2 is added as a connection destination of the mobile station 100 in the case where the base station BS2 is capable of directional beam signal transmission and reception is farther from the base station BS2 than the position of the mobile station 100 when the base station BS2 is added as a connection destination of the mobile station 100 in the case where the base station BS2 is incapable of directional beam signal transmission and reception. That is, the mobile station 100 is more preferentially connected to the base station BS2 via the radio link when the base station BS2 is capable of directional beam signal transmission and reception than when the base station BS2 is incapable of directional beam signal transmission and reception. As a result, quality of the received signals is improved at the base station and the mobile station.

Figure 11:
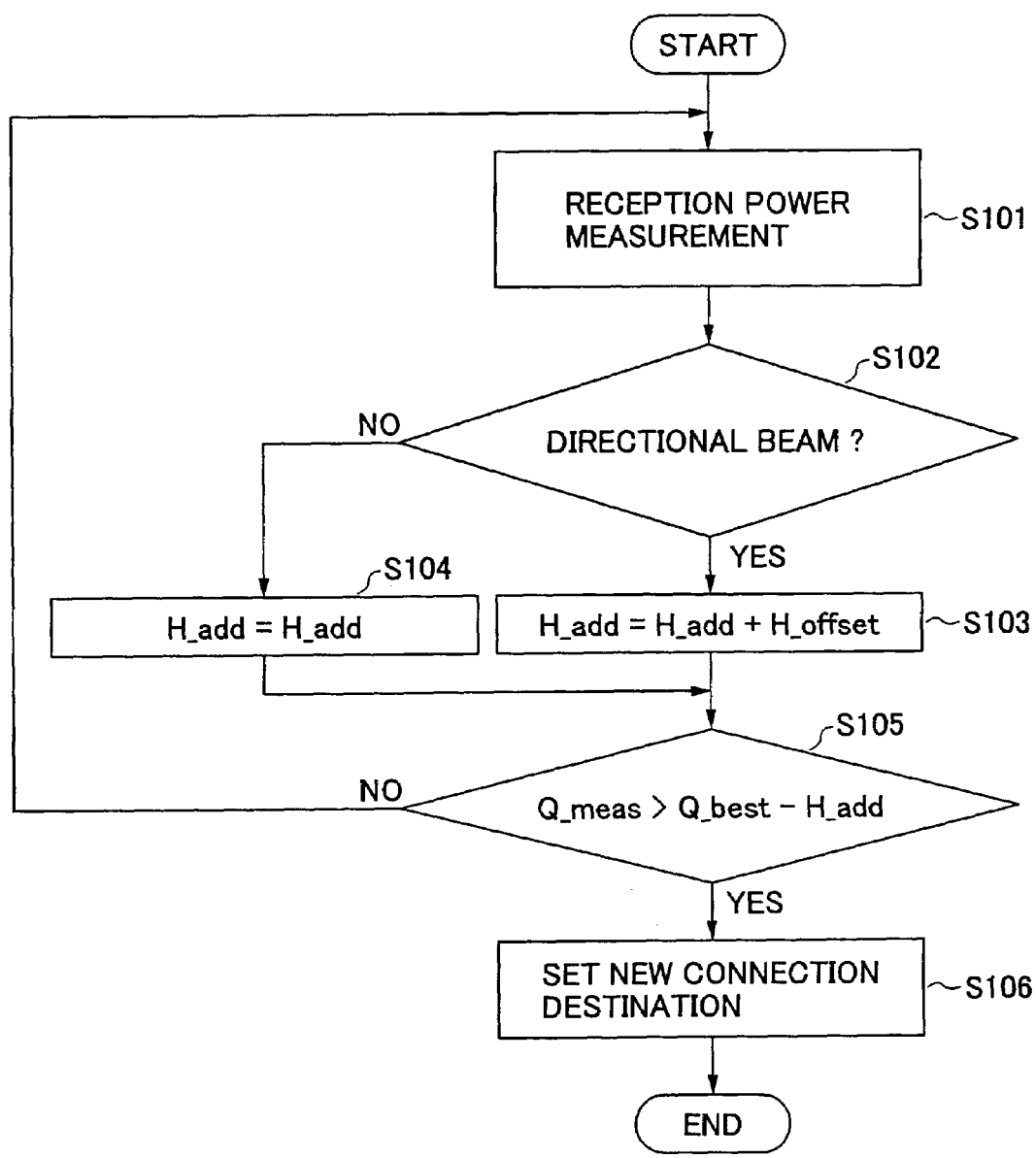
FIG. 11 is a flowchart showing the operations of the mobile station 100 and the radio network controller 140 according to the first embodiment of the present invention.

FIG. 11 is a flowchart showing the operations of the mobile station 100 and the radio network controller 140 according to the first embodiment of the present invention.

In step 101, the mobile station 100 receives the common pilot channel signals transmitted from base stations 120 in the surrounding area and measures their reception power levels.

In step 102, the RNC 140 determines whether the destination base station BS2 is capable of directional beam signal transmission and reception.

In step 103, if the destination base station BS2 is capable of directional beam signal transmission and reception, the RNC 140 sets a new handover threshold, which is obtained by adding an offset (H_offset) to a predetermined handover addition threshold (H_add).

In step 104, if the destination base station BS2 is incapable of directional beam signal transmission and reception, the RNC 140 sets the original handover addition threshold (H_add) as the handover threshold.

In step S105, the RNC 140 determines whether the difference between the reception power (Q_best) of the common pilot channel signals transmitted from the source base station BS1 and the reception power (Q_meas) of the common pilot channel signals transmitted from the destination base station BS2 is smaller than the handover addition threshold as set in step S103 or S104.

If the difference is not smaller than the handover addition threshold, the routine proceeds back to the step S101, and the above steps are repeated.

In step S106, if the difference obtained in step 105 becomes smaller than the handover addition threshold, the RNC 140 adds the destination base station BS2 to the list of the connection destinations of the mobile station 100 via the radio link.

Second Embodiment

Below, an explanation is made of the second embodiment of the present invention related to deletion of the base station 120 from the list of the connection destinations of the mobile station 100 via the radio link in the course of handover.

Figure 12:
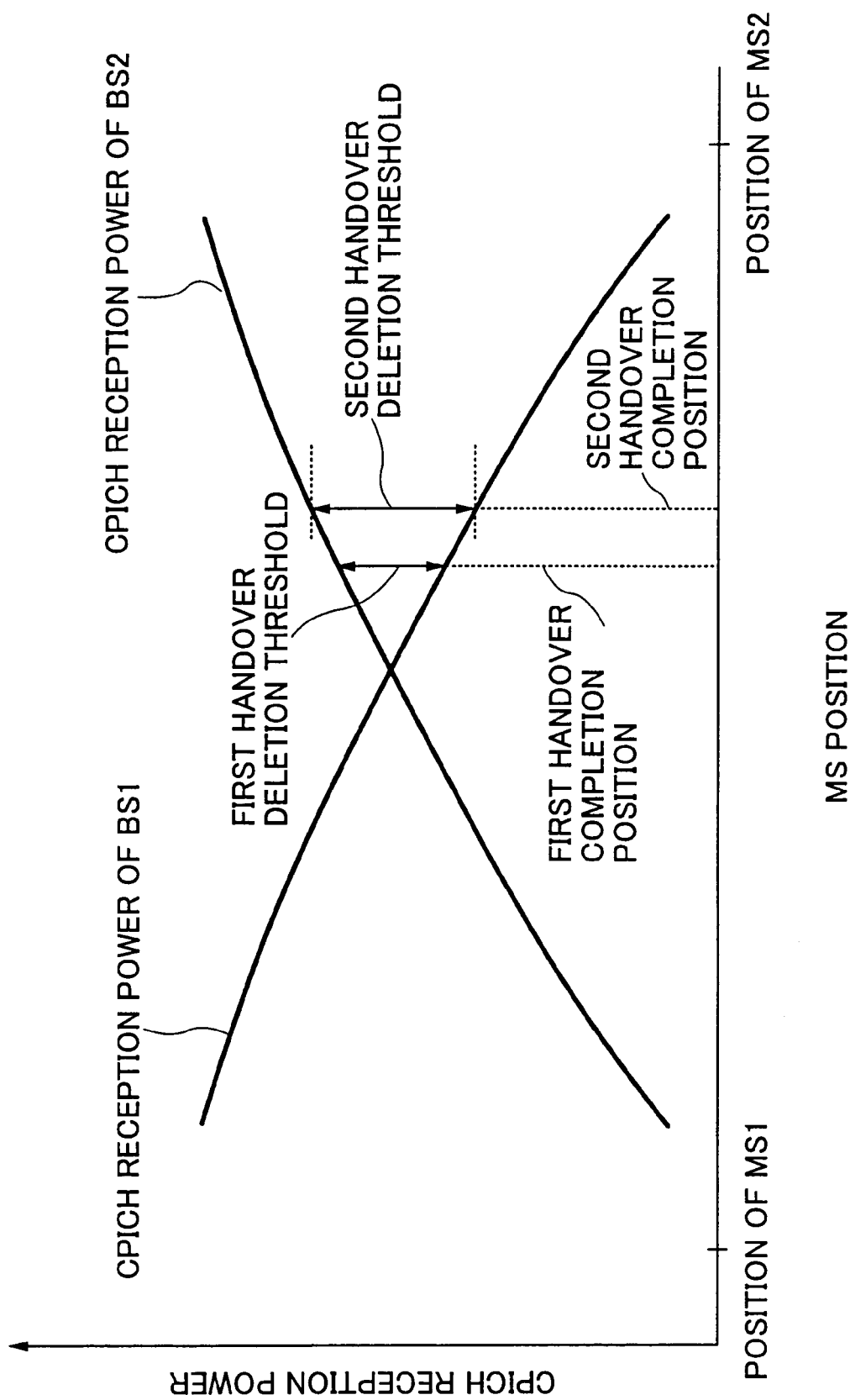
FIG. 12 is a graph showing the relation between the position of the mobile station 100 and the reception power of the common pilot channel signals according to a second embodiment of the present invention.

FIG. 12 is a view showing the relation between the position of the mobile station 100 and the reception power of the common pilot channel signals in the course of handover according to the second embodiment of the present invention. Here, it is assumed that the base station BS2 is incapable of directional beam signal transmission and reception.

After the base station BS2 is added to the list of the connection destinations of the mobile station 100 via the radio link in addition to the base station BS1, the handover process is started, and the mobile station 100 transmits signals to and receives signals from both the base station BS1 and the base station BS2.

After that, the mobile station 100 moves away from the base station BS1 and close to the base station BS2, and the reception power of the common pilot channel signals transmitted from the base station BS2 becomes larger than the reception power of the common pilot channel signals transmitted from the base station BS1.

The base station connection control unit 146 of the RNC 140 monitors the difference between the reception power of the common pilot channel signals transmitted from the base station BS2 and the reception power of the common pilot channel signals transmitted from the base station BS1. Below this difference is referred to as "the second reception power difference".

When the mobile station 100 moves away from the base station BS1 and close to the base station BS2, the second reception power difference increases gradually.

If the source base station BS1 is incapable of directional beam signal transmission and reception, and when the second reception power difference becomes larger than a predetermined value (a first threshold, or a first handover deletion threshold), the base station connection control unit 146 of the RNC 140 deletes the base station BS1 from the list of the connection destination of the mobile station 100 via the radio link.

Further, the base station connection control unit 146 of the RNC 140 transmits signals including identification information of the mobile station 100 to the base station BS1 to request disconnection of the radio link. The base station BS1 identifies the mobile station 100 based on the identification information of the mobile station 100 included in the disconnection request signals, and disconnects the radio link with the mobile station 100.

If the source base station BS1 is capable of directional beam signal transmission and reception, and when the second reception power difference becomes larger than a second threshold, or a second handover deletion threshold that is obtained by adding an offset to the second handover deletion threshold, the base station connection control unit 146 of the RNC 140 deletes the base station BS1 from the list of the connection destinations of the mobile station 100 via the radio link.

Further, the base station connection control unit 146 of the RNC 140 transmits signals including identification information of the mobile station 100 to the base station BS1 to request disconnection of the radio link. The base station BS1 identifies the mobile station 100 based on the identification information of the mobile station 100 included in the disconnection request signals, and disconnects the radio link with the mobile station 100.

After the mobile station 100 is disconnected from the source base station BS1 via the radio link, the handover process is ended. After the mobile station 100 is disconnected from the base station BS1 via the radio link, the mobile station 100 transmits signals to and receives signals from only the destination base station BS2.

Because the second handover deletion threshold is larger than the first handover deletion threshold, the position of the mobile station 100 when the base station BS1 is deleted from the list of the connection destinations of the mobile station 100 via the radio link is different depending on whether the base station BS1 is capable of directional beam signal transmission and reception. Specifically, the position of the mobile station 100 when the base station BS1 is deleted in the case where the base station BS1 is capable of directional beam signal transmission and reception is farther from the base station BS1 than the position of the mobile station 100 when the base station BS1 is deleted in the case where the base station BS1 is incapable of directional beam signal transmission and reception. That is, the radio link connection between the mobile station 100 and the base station BS1 is preferentially maintained. As a result, quality of the received signals is improved at the base station and the mobile station.

Figure 13:
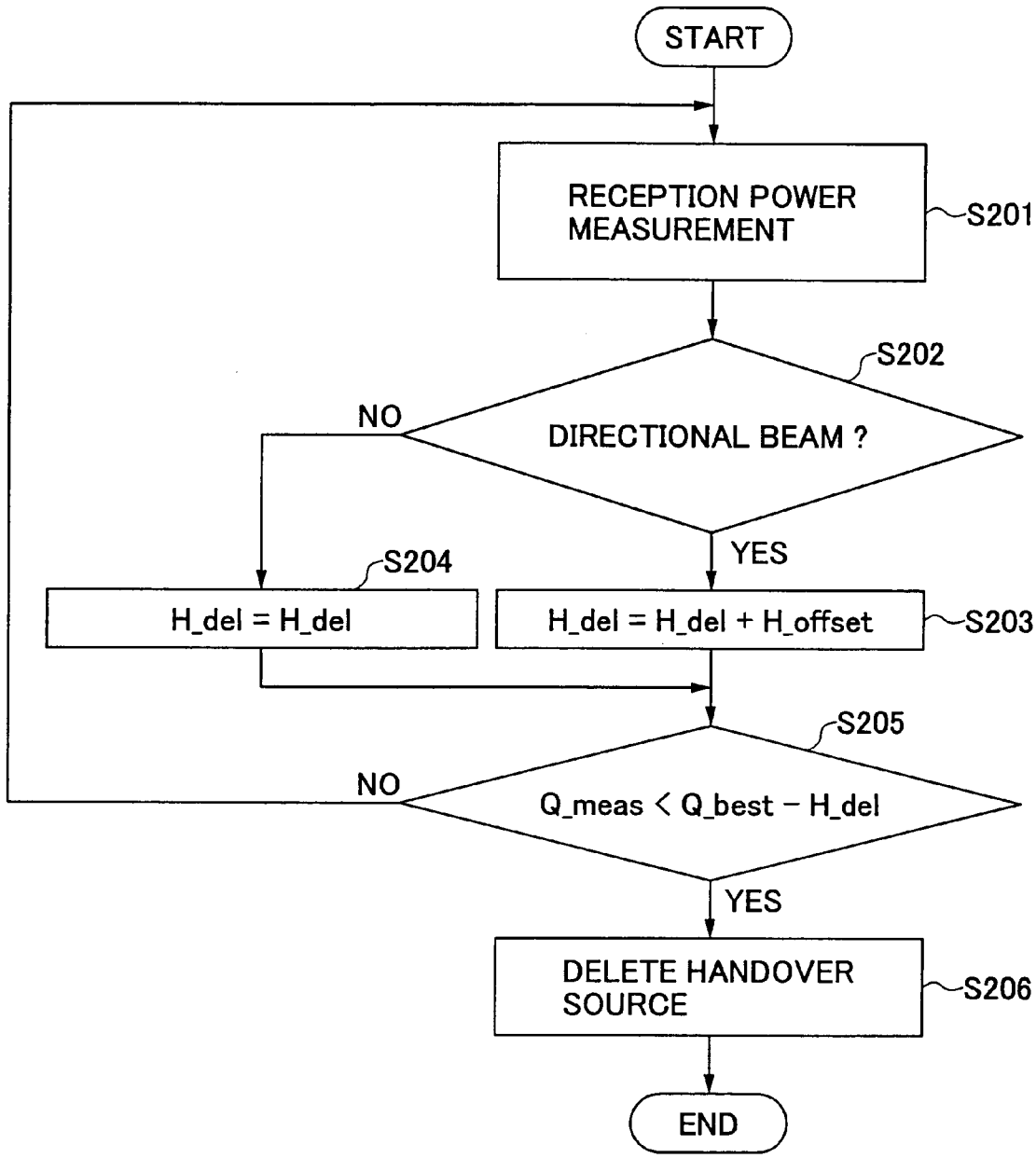
FIG. 13 is a flowchart showing the operations of the mobile station 100 and the radio network controller 140 according to the second embodiment of the present invention.

FIG. 13 is a flowchart showing the operations of the mobile station 100 and the radio network controller 140 according to the second embodiment of the present invention.

In step 201, the mobile station 100 receives the common pilot channel signals transmitted from base stations 120 in the surrounding area and measures their reception power levels.

In step 202, the RNC 140 determines whether the source base station BS1 is capable of directional beam signal transmission and reception.

In step 203, if the source base station BS1 is capable of directional beam signal transmission and reception, the RNC 140 sets a new handover threshold, which is obtained by adding an offset (H_offset) to a predetermined handover deletion threshold (H_del).

In step 204, if the source base station BS1 is incapable of directional beam signal transmission and reception, the RNC 140 sets the original handover deletion threshold (H_del) as the handover threshold.

In step S205, the RNC 140 determines whether the difference between the reception power (Q_best) of the common pilot channel signals transmitted from the destination base station BS2 and the reception power (Q_meas) of the common pilot channel signals transmitted from the source base station BS1 is larger than the handover threshold as set in step S203 or S204.

If the difference is not larger than the handover threshold, the routine proceeds back to the step S201, and the above steps are repeated.

In step S206, if the difference obtained in step 205 becomes larger than the handover addition threshold, the RNC 140 deletes the source base station BS1 from the list of the connection destinations of the mobile station 100 via the radio link.

Third Embodiment

Below, an explanation is made of the third embodiment of the present invention related to switching of the base stations 120 serving as the connection destination of the mobile station 100 via the radio link when the mobile station is on standby.

Figure 14:
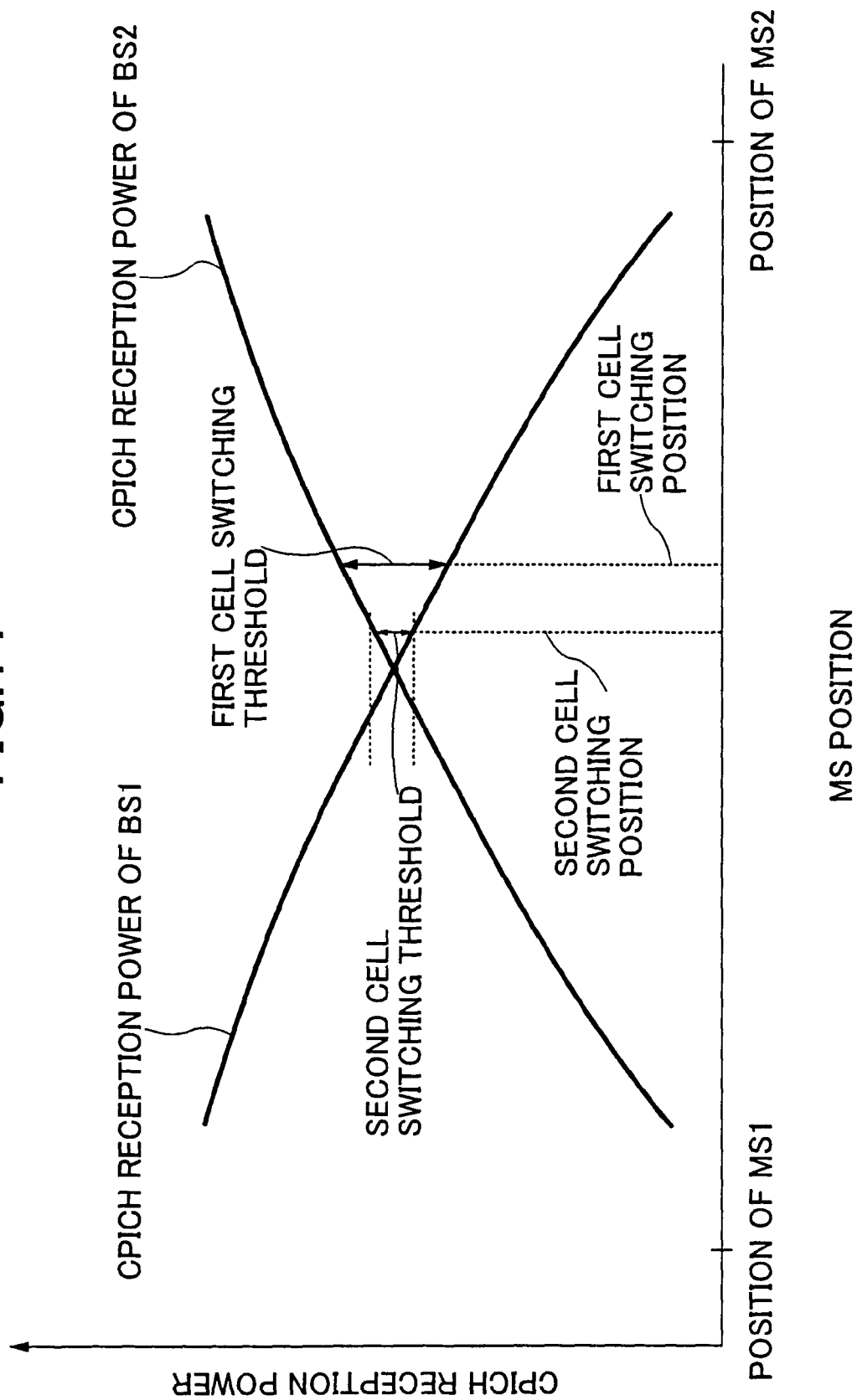
FIG. 14 is a graph showing the relation between the position of the mobile station 100 and the reception power of the common pilot channel signals according to a third embodiment of the present invention.

FIG. 14 is a graph showing the relation between the position of the mobile station 100 and the reception power of the common pilot channel signals according to the third embodiment of the present invention. Here, it is assumed that the base station BS1 is incapable of directional beam signal transmission and reception.

At certain time intervals, the power measurement unit 108 of the mobile station 100 measures the reception power of the common pilot channel signals transmitted from base stations in the surrounding area at certain transmission power levels, for example, signals from base stations BS1 and BS2.

Further, the base station connection unit 110 of the mobile station 100 selects a base station yielding the largest reception power of the common pilot channel signals and connects to the base station via the radio link. Then the mobile station 100 is on standby.

As shown in FIG. 14, when the mobile station 100 is within the service area of the base station BS1 but out of the service area of the base station BS2, the reception power of the common pilot channel signals transmitted from the base station BS1 is larger than the reception power of the common pilot channel signals transmitted from the base station BS2. Therefore, the base station connection unit 110 of the mobile station 100 connects to the base station BS1 through the radio link, and the mobile station 100 is on standby.

The base station connection unit 110 of the mobile station 100 monitors the difference between the reception power of the common pilot channel signals transmitted from the base station BS2, which is the switching destination, and the reception power of the common pilot channel signals transmitted from the base station BS1, which is the source. Below, this difference is referred to as "the third reception power difference".

When the mobile station 100 moves away from the base station BS1 and close to the base station BS2, the reception power of the common pilot channel signals transmitted from the base station BS1 decreases, and the reception power of the common pilot channel signals transmitted from the base station BS2 increases, and the third reception power difference increases gradually.

If the destination base station BS2 is incapable of directional beam signal transmission and reception, and when the third reception power difference becomes larger than a predetermined value (a first cell switching threshold), the base station connection unit 110 of the mobile station 100 switches the connection destination of the mobile station 100 via the radio link from the base station BS1 to the base station BS2, and the mobile station 100 continues to be on standby.

If the destination base station BS2 is capable of directional beam signal transmission and reception, and when the third reception power difference becomes larger than a second threshold (a second cell switching threshold) obtained by subtracting an offset from the first cell switching threshold, the base station connection unit 110 of the mobile station 100 switches the connection destination of the mobile station 100 via the radio link from the base station BS1 to the base station BS2, and the mobile station 100 connects with the base station BS2 via the radio link and continues to be on standby.

It should be noted that the first cell switching threshold and the second cell switching threshold may be set in advance in the mobile station 100, or may be transmitted from the RNC 140 through the base stations. When the first cell switching threshold and the second cell switching threshold are transmitted from the RNC 140, the transmitter and receiver 104 of the mobile station 100 receives the signals and sends them to the base station connection unit 110.

Because the second cell switching threshold is smaller than the first cell switching threshold, the position of the mobile station 100 when the connection destination of the mobile station 100 via the radio link is switched from the base station BS1 to the base station BS2 is different depending on whether the base station BS2 is capable of directional beam signal transmission and reception. Specifically, the position of the mobile station 100 when the switching occurs in the case where the base station BS2 is capable of directional beam signal transmission and reception is farther from the base station BS2 than the position of the mobile station 100 when the switching occurs in the case where the base station BS2 is incapable of directional beam signal transmission and reception. That is, the mobile station 100 more preferentially switches its radio link connection destination to the base station BS2. As a result, quality of the received signals is improved at the base station and the mobile station.

Figure 15:
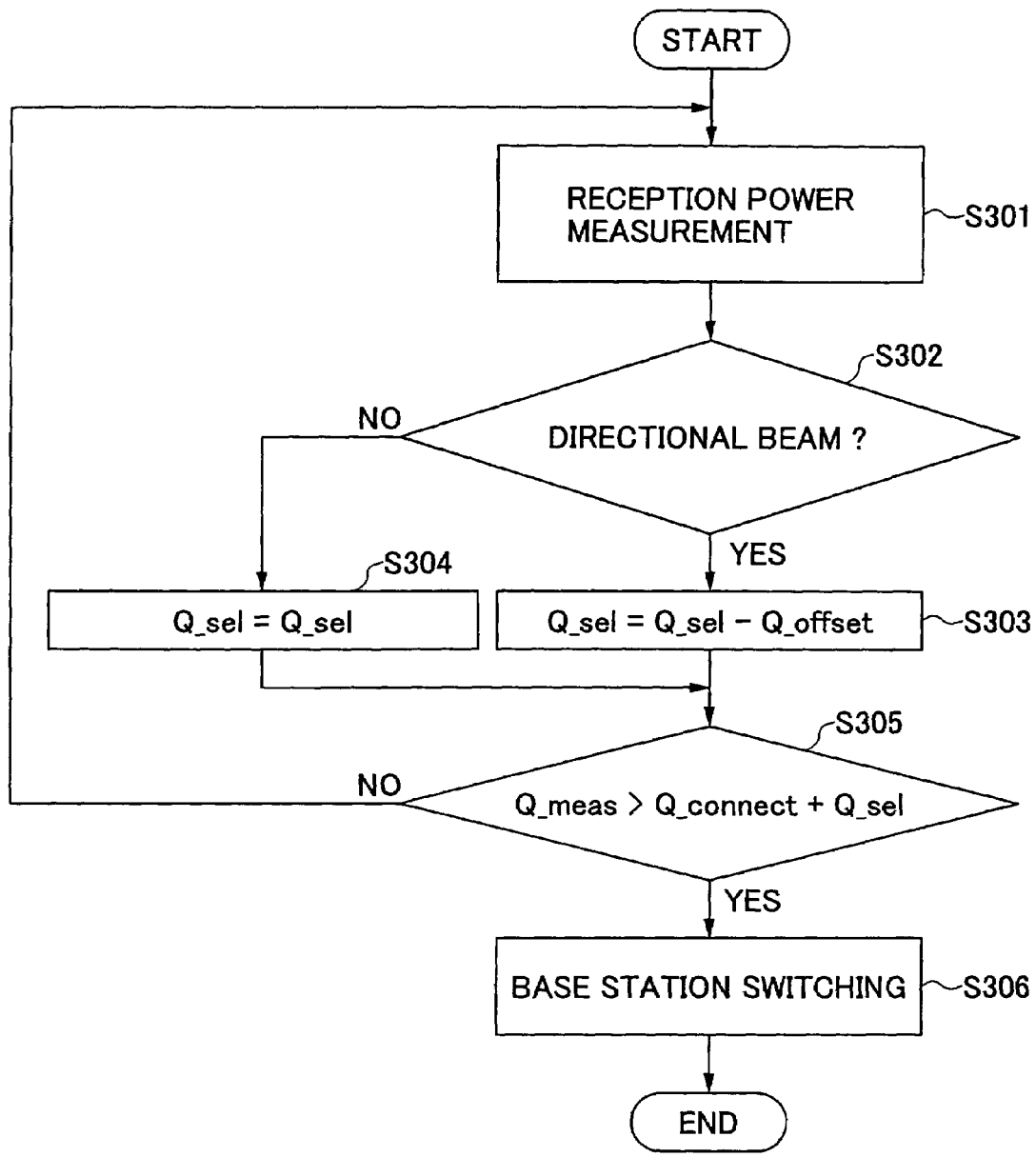
FIG. 15 is a flowchart showing the operations of the mobile station 100 according to the third embodiment of the present invention.

FIG. 15 is a flowchart showing the operations of the mobile station 100 according to the third embodiment of the present invention.

In step 301, the mobile station 100 receives the common pilot channel signals transmitted from base stations 120 in the surrounding area and measures their reception power levels.

In step 302, the mobile station 100 determines whether the destination base station BS2 is capable of directional beam signal transmission and reception.

In step 303, if the destination base station BS2 is capable of directional beam signal transmission and reception, mobile station 100 sets a new cell switching threshold obtained by subtracting an offset (Q_offset) from a predetermined cell switching threshold (Q_sel).

In step 304, if the destination base station BS2 is incapable of directional beam signal transmission and reception, the mobile station 100 sets the original cell switching threshold (Q_sel) as the cell switching threshold.

In step S305, the mobile station 100 determines whether the difference between the reception power (Q_meas) of the common pilot channel signals transmitted from the destination base station BS2 and the reception power (Q_connect) of the common pilot channel signals transmitted from the source base station BS1 is larger than the cell switching threshold as set in step S303 or S304.

If the difference is not larger than the cell switching threshold, the routine proceeds back to the step S301, and the above steps are repeated.

In step S306, if the difference obtained in step 305 becomes larger than the cell switching threshold, the mobile station 100 switches the connection destination of the mobile station 100 via the radio link from the source base station BS1 to the destination base station BS2, and connects to the base station BS2 via the radio link.

Fourth Embodiment

Below, an explanation is made of the fourth embodiment of the present invention related to switching of the base stations 120 serving as the connection destination of the mobile station 100 via the radio link when the mobile station is on standby.

Figure 16:
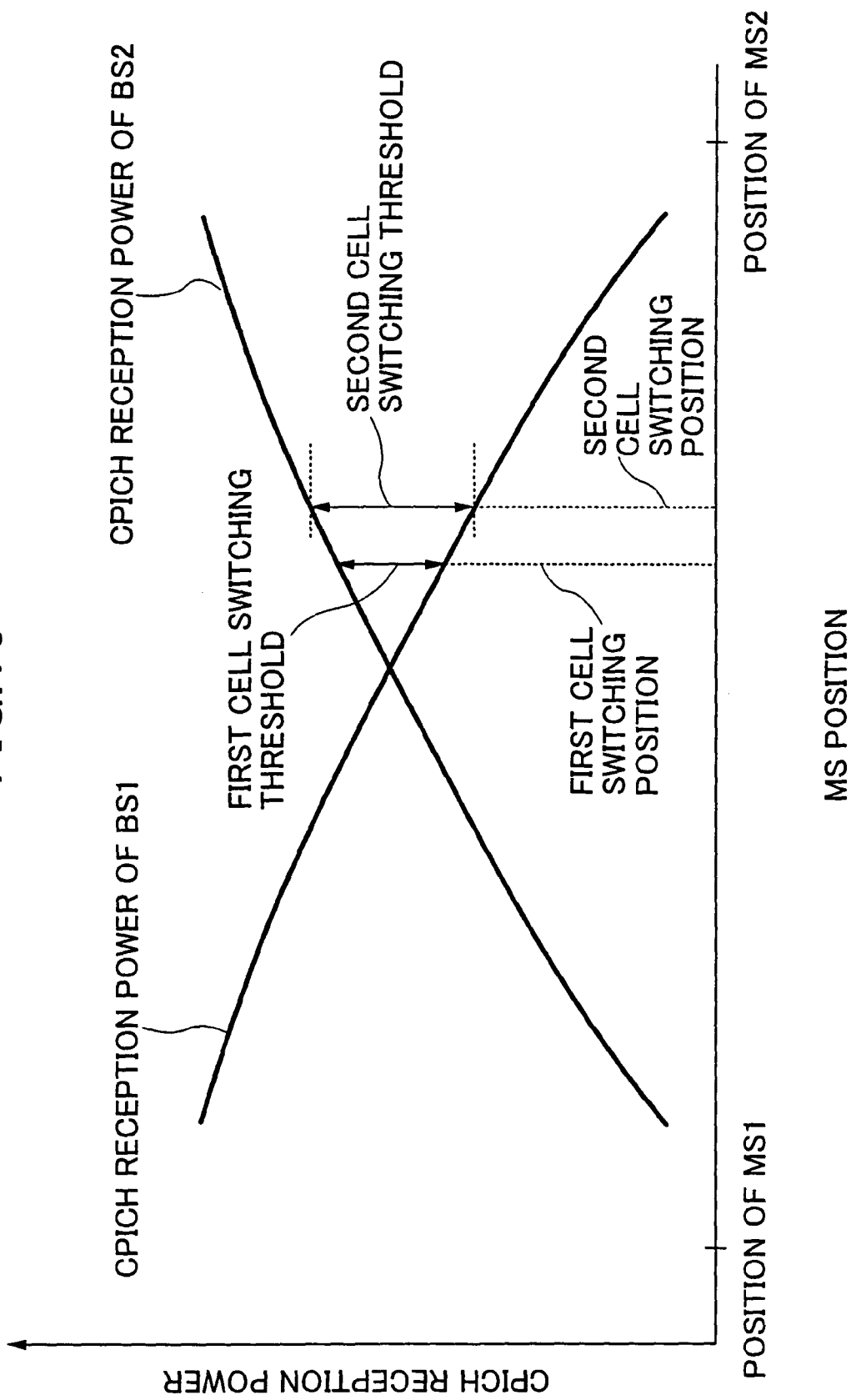
FIG. 16 is a graph showing the relation between the position of the mobile station 100 and the reception power of the common pilot channel signals according to a fourth embodiment of the present invention.

FIG. 16 is a graph showing the relation between the position of the mobile station 100 and the reception power of the common pilot channel signals according to the fourth embodiment of the present invention. Here, it is assumed that the base station BS1 is capable of directional beam signal transmission and reception.

At certain time intervals, the power measurement unit 108 of the mobile station 100 measures the reception power of the common pilot channel signals transmitted from base stations in the surrounding area at certain transmission power levels, for example, signals from base stations BS1 and BS2.

Further, the base station connection unit 110 of the mobile station 100 selects a base station yielding the largest reception power of the common pilot channel signals and connects to the base station via the radio link. Then the mobile station 100 is on standby.

As shown in FIG. 16, when the mobile station 100 is within the service area of the base station BS1 but out of the service area of the base station BS2, the reception power of the common pilot channel signals transmitted from the base station BS1 is larger than the reception power of the common pilot channel signals transmitted from the base station BS2. Therefore, the base station connection unit 110 of the mobile station 100 connects to the base station BS1 through the radio link, and the mobile station 100 is on standby.

The base station connection unit 110 of the mobile station 100 monitors the difference between the reception power of the common pilot channel signals transmitted from the base station BS2, which is the switching destination, and the reception power of the common pilot channel signals transmitted from the source base station BS1. Below, this difference is referred to as "the fourth reception power difference".

When the mobile station 100 moves away from the base station BS1 and close to the base station BS2, the reception power of the common pilot channel signals transmitted from the base station BS1 decreases, and the reception power of the common pilot channel signals transmitted from the base station BS2 increases, and the fourth reception power difference increases gradually.

If the destination base station BS2 is capable of directional beam signal transmission and reception, and when the fourth reception power difference becomes larger than a predetermined value (a first cell switching threshold), the base station connection unit 110 of the mobile station 100 switches the connection destination of the mobile station 100 via the radio link from the base station BS1 to the base station BS2, and the mobile station 100 continues to be on standby.

If the destination base station BS2 is incapable of directional beam signal transmission and reception, and when the fourth reception power difference becomes larger than a second threshold (a second cell switching threshold) obtained by adding an offset to the first cell switching threshold, the base station connection unit 110 of the mobile station 100 switches the connection destination of the mobile station 100 via the radio link from the base station BS1 to the base station BS2, and the mobile station 100 connects with the base station BS2 via the radio link and continues to be on standby.

It should be noted that the first cell switching threshold and the second cell switching threshold may be set in advance in the mobile station 100, or may be transmitted from the RNC 140 through the base stations. When the first cell switching threshold and the second cell switching threshold are transmitted from the RNC 140, the transmitter and receiver 104 of the mobile station 100 receives the signals and sends them to the base station connection unit 110.

Because the second cell switching threshold is larger than the first cell switching threshold, the position of the mobile station 100 when the connection destination of the mobile station 100 via the radio link is switched from the base station BS1 to the base station BS2 is different depending on whether the base station BS2 is capable of directional beam signal transmission and reception. Specifically, the position of the mobile station 100 when the switching occurs in the case where the base station BS2 is incapable of directional beam signal transmission and reception is farther from the base station BS1 than the position of the mobile station 100 when the switching occurs in the case where the base station BS2 is capable of directional beam signal transmission and reception. That is, the mobile station 100 more preferentially maintains its radio link connection with the base station BS1. As a result, quality of the received signals is improved at the base station and the mobile station.

Figure 17:
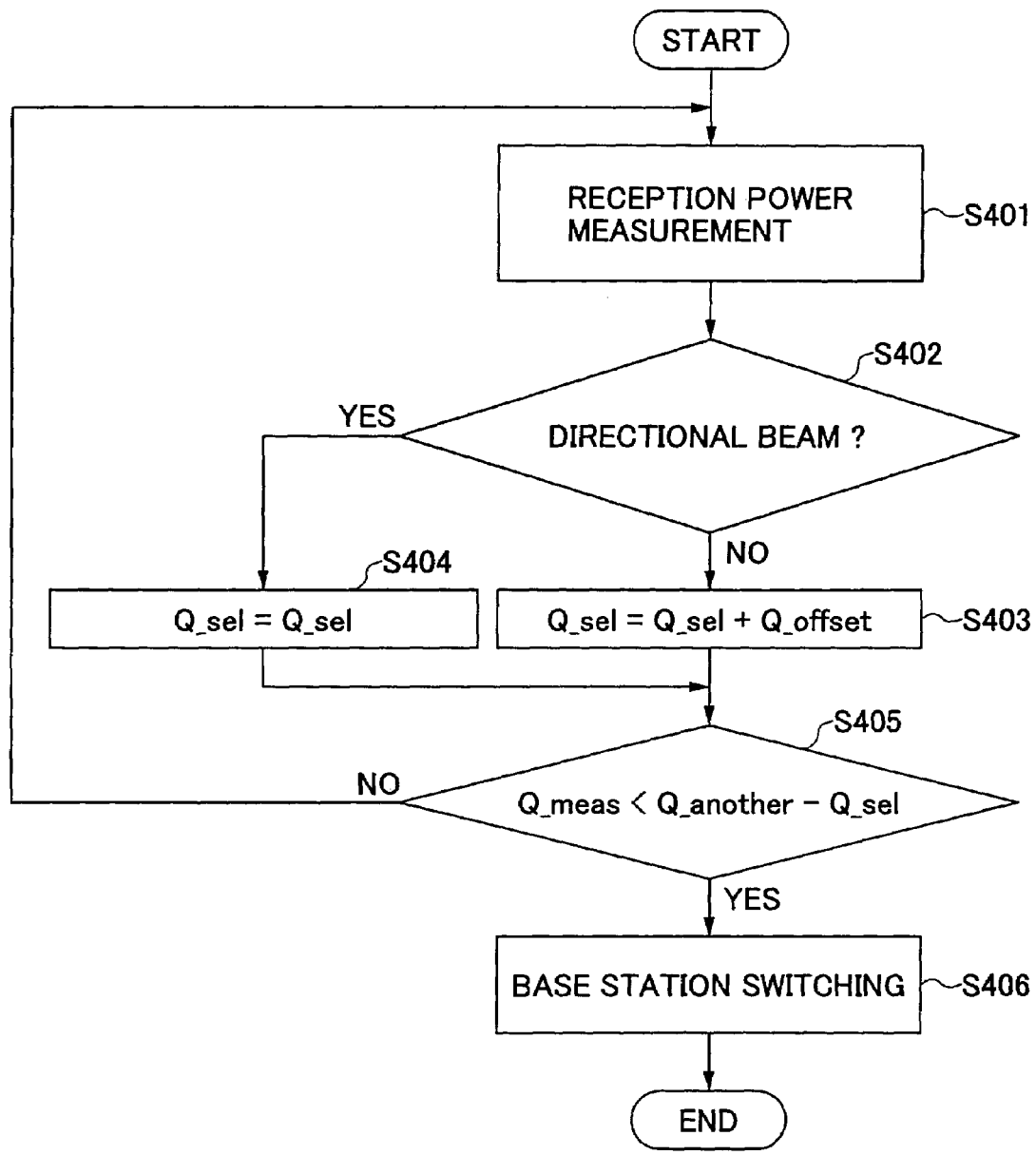
FIG. 17 is a flowchart showing the operations of the mobile station 100 according to the fourth embodiment of the present invention.

FIG. 17 is a flowchart showing the operations of the mobile station 100 according to the fourth embodiment of the present invention.

In step 401, the mobile station 100 receives the common pilot channel signals transmitted from base stations 120 in the surrounding area and measures their reception power levels.

In step 402, the mobile station 100 determines whether the destination base station BS2 is capable of directional beam signal transmission and reception.

In step 403, if the destination base station BS2 is incapable of directional beam signal transmission and reception, mobile station 100 sets a new cell switching threshold obtained by adding an. offset (Q_offset) to a predetermined cell switching threshold (Q_sel).

In step 404, if the destination base station BS2 is capable of directional beam signal transmission and reception, the mobile station 100 sets the original cell switching threshold (Q_sel) as the cell switching threshold.

In step S405, the mobile station 100 determines whether the difference between the reception power (Q_another) of the common pilot channel signals transmitted from the destination base station BS2 and the reception power (Q_meas) of the common pilot channel signals transmitted from the source base station BS1 is larger than the cell switching threshold Q_sel set in step S403 or S404.

If the difference is not larger than the cell switching threshold Q_sel, the routine proceeds back to the step S401, and the above steps are repeated.

In step S406, if the difference obtained in step 405 becomes larger than the cell switching threshold Q_sel, the mobile station 100 switches the connection destination of the mobile station 100 via the radio link from the source base station BS1 to the destination base station BS2, and connects to the base station BS2 via the radio link.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

Summarizing the effect of the invention, as described above, the mobile station is preferentially connected to a base station capable of directional beam signal transmission and reception, and as a result, quality of the received signals is improved at the base station and the mobile station.

In the course of handover, if the destination base station is capable of directional beam signal transmission and reception, even if the difference between the reception power of signals transmitted from a source base station and the reception power of signals transmitted from a destination base station is large, the destination base station is added as a radio link connection destination, and the handover process starts.

Further, if the source base station is capable of directional beam signal transmission and reception, even if the difference between the reception power of signals transmitted from the source base station and the reception power of signals transmitted from the destination base station is large, the radio link connection between mobile station and the source base station is maintained.

According to the present invention, when the mobile station is on standby and moves from a source base station and a destination base station, if the destination base station is capable of directional beam signal transmission and reception, even if the difference between the reception power of signals transmitted from the source base station and the reception power of signals transmitted from the destination base station is small, the radio link connection destination is switched to the destination base station.

Further, if the source base station is capable of directional beam signal transmission and reception, even if the difference between the reception power of signals transmitted from the source base station and the reception power of signals transmitted from the destination base station is large, the radio link connection destination between the mobile station and the source base station is maintained.

Accordingly, the mobile station is preferentially connected to the base station via the radio link capable of directional beam signal transmission and reception, and quality of the received signals is improvable at the base station and the mobile station.

This patent application is based on Japanese priority patent application No. 2002-224955 filed on Aug. 1, 2002, the entire contents of which are hereby incorporated by reference.

What is claimed is:

1. A method of connecting a mobile station with a base station via a radio link in a mobile communication system including a first base station capable of directional beam signal transmission and reception and a second base station incapable of directional beam signal transmission and reception, the method comprising:

setting a first connection threshold value for connecting the mobile station with the first base station being capable of a direction beam, and a second connection threshold value different from the first connection threshold value for connecting the mobile station with the second base station incapable of a directional beam, and setting a first disconnection threshold value for disconnecting the mobile station with the first base station, and a second disconnection threshold value different from the first disconnection threshold value for disconnecting the mobile station with the second base station, so as to preferentially connect the mobile station to the first base station capable of a directional beam rather than to the second base station incapable of a directional beam.

2. The method as claimed in claim 1, wherein the preferentially connecting the mobile station to the first base station includes:

setting the different handover threshold values for connecting and disconnecting the mobile station with the first base station and the second station, respectively, when the mobile station undergoes handover.

3. The method as claimed in claim 1, wherein the preferentially connecting the mobile station to the first base station includes:

setting the different threshold values for connecting and disconnecting the mobile station with the first base station and the second station, respectively, when the mobile station is on standby and switches a connection destination thereof.

4. A radio network controller for controlling a radio link connection between a mobile station and a base station in a mobile communication system including a first base station capable of directional beam signal transmission and reception and a second base station incapable of directional beam signal transmission and reception, the radio network controller comprising:

a base station connection control unit configured to set a first connection threshold value for connecting the mobile station with the first base station being capable of a direction beam, and a second connection threshold value different from the first connection threshold value for connecting the mobile station with the second base station incapable of a directional beam, and setting a first disconnection threshold value for disconnecting the mobile station with the first base station, and a second disconnection threshold value different from the first disconnection threshold value for disconnecting the mobile station with the second base station, so as to preferentially connect the mobile station to the first base station capable of a directional beam rather than to the second base station incapable of a directional beam.

5. The radio network controller as claimed in claim 4, wherein the base station connection control unit sets the different handover threshold values for connecting and disconnecting the mobile station with the first base station and the second station, respectively.

6. The radio network controller as claimed in claim 5, wherein the handover threshold value is defined as an absolute value of a difference between power of signals from a handover source base station and power of signals from a handover destination base station, and the handover threshold value for connecting the mobile station with the first base station is larger than the handover threshold value for connecting the mobile station with the second base station.

7. The radio network controller as claimed in claim 5, wherein the handover threshold value is defined as an absolute value of a difference between power of signals from a handover source base station and power of signals from a handover destination base station, and the handover threshold value for disconnecting the mobile station and the first base station is larger than the handover threshold value for disconnecting the mobile station and the second base station.

8. A mobile station in a mobile communication system including a first base station capable of directional beam signal transmission and reception and a second base station incapable of directional beam signal transmission and reception, the mobile station comprising:

a base station connection unit configured to set a first connection threshold value for connecting the mobile station with the first base station being capable of a direction beam, and a second connection threshold value different from the first connection threshold value for connecting the mobile station with the second base station incapable of a directional beam, and setting a first disconnection threshold value for disconnecting the mobile station with the first base station, and a second disconnection threshold value different from the first disconnection threshold value for disconnecting the mobile station with the second base station, so as to preferentially connect the mobile station to the first base station capable of a directional beam rather than to the second base station incapable of a directional beam.

9. The mobile station as claimed in claim 8, wherein the base station connection unit sets the different handover threshold values for connecting and disconnecting the mobile station with the first base station and the second station, respectively, when the mobile station is on standby and switches a connection destination thereof.

10. The mobile station as claimed in claim 9, wherein the threshold value is defined as an absolute value of a difference between power of signals from a switching source base station and power of signals from a switching destination base station, and the threshold value for switching to the first base station is smaller than the threshold value for switching to the second base station.

11. The mobile station as claimed in claim 9, wherein the threshold value is defined as an absolute value of a difference between power of signals from a switching source base station and power of signals from a switching destination base station, and the threshold value for switching from the first base station is larger than the threshold value for switching from the second base station.

12. The mobile station as claimed in claim 8, further comprising:

a base station determination unit configured to identify and distinguish the first base station from the second base station.

13. The mobile station as claimed in claim 9, further comprising:

a threshold value receiver configured to receive the threshold values.

\* \* \* \* \*